(12) United States Patent
Harvey et al.

(10) Patent No.: US 8,349,434 B2
(45) Date of Patent: Jan. 8, 2013

(54) BLENDED FLUOROPOLYMER COATINGS FOR RIGID SUBSTRATES

(75) Inventors: Leonard W. Harvey, Downingtown, PA (US); Lawrence D. Leech, West Chester, PA (US)

(73) Assignee: Whitford Corporation, Inc., Elverson, PA (US)

( * ) Notice: Subject to any disclaimer, the term of this patent is extended or adjusted under 35 U.S.C. 154(b) by 0 days.

(21) Appl. No.: 13/410,357

(22) Filed: Mar. 2, 2012

(65) Prior Publication Data

US 2012/0165458 A1   Jun. 28, 2012

Related U.S. Application Data

(62) Division of application No. 12/567,330, filed on Sep. 25, 2009.

(60) Provisional application No. 61/100,311, filed on Sep. 26, 2008, provisional application No. 61/109,950, filed on Oct. 31, 2008, provisional application No. 61/145,433, filed on Jan. 16, 2009, provisional application No. 61/145,875, filed on Jan. 20, 2009.

(51) Int. Cl.
  D06N 7/04   (2006.01)
  G11B 5/64   (2006.01)
  C08L 27/14  (2006.01)

(52) U.S. Cl. ....................................... 428/141; 525/199
(58) Field of Classification Search .................. 428/141; 525/199
  See application file for complete search history.

(56) References Cited

U.S. PATENT DOCUMENTS

| | | | |
|---|---|---|---|
| 3,692,759 A | 9/1972 | Ocone |
| 3,803,108 A | 4/1974 | Ocone |
| 4,123,401 A | 10/1978 | Berghmans et al. |
| 4,150,008 A | 4/1979 | Vassiliou et al. |
| 4,252,859 A | 2/1981 | Concannon et al. |
| 4,610,918 A | 9/1986 | Effenberger et al. |
| 4,654,235 A | 3/1987 | Effenberger et al. |
| 4,749,752 A | 6/1988 | Youlu et al. |
| 4,767,646 A | 8/1988 | Cordova et al. |
| 4,904,735 A | 2/1990 | Chapman, Jr. et al. |
| 4,914,158 A | 4/1990 | Yoshimura et al. |
| 4,952,630 A | 8/1990 | Morgan et al. |
| 4,960,431 A | 10/1990 | Cordova et al. |
| 5,240,660 A | 8/1993 | Marshall |
| 5,317,061 A | 5/1994 | Chu et al. |
| 5,397,629 A | 3/1995 | Jahn |
| 5,444,116 A | 8/1995 | Amin et al. |
| 5,468,798 A | 11/1995 | Leech |
| 5,473,018 A | 12/1995 | Namura et al. |
| 5,501,879 A | 3/1996 | Murayama |
| 5,560,978 A | 10/1996 | Leech |
| 5,590,420 A | 1/1997 | Gunn |
| 5,603,999 A | 2/1997 | Namura et al. |
| 5,708,044 A | 1/1998 | Branca |
| 5,752,278 A | 5/1998 | Gunn |
| 5,829,057 A | 11/1998 | Gunn |
| 6,021,523 A | 2/2000 | Vero |
| 6,061,829 A | 5/2000 | Gunn |
| 6,080,474 A | 6/2000 | Oakley et al. |
| 6,133,359 A | 10/2000 | Bate et al. |
| 6,143,368 A | 11/2000 | Gunn |
| 6,255,384 B1 | 7/2001 | McCarthy et al. |
| 6,403,213 B1 | 6/2002 | Huesmann |
| 6,436,533 B1 | 8/2002 | Heffner et al. |
| 6,461,679 B1 | 10/2002 | McMeekin et al. |
| 6,531,559 B1 | 3/2003 | Smith et al. |
| 6,548,612 B2 | 4/2003 | Smith et al. |
| 6,596,207 B1 | 7/2003 | Gunn |
| 6,649,699 B2 | 11/2003 | Namura |
| 6,673,125 B2 | 1/2004 | Miller et al. |
| 6,673,416 B1 | 1/2004 | Nishio |
| 6,737,165 B1 | 5/2004 | Smith et al. |
| 6,750,162 B2 | 6/2004 | Underwood et al. |
| 6,761,964 B2 | 7/2004 | Tannenbaum |
| 6,800,176 B1 | 10/2004 | Birchenall |
| 6,800,602 B1 | 10/2004 | Kvita et al. |
| 6,824,872 B2 | 11/2004 | Coates et al. |
| 6,846,570 B2 | 1/2005 | Leech et al. |
| 6,867,261 B2 | 3/2005 | Bladel et al. |
| 6,872,424 B2 | 3/2005 | Linford et al. |
| 7,012,109 B2 | 3/2006 | Visca et al. |

(Continued)

FOREIGN PATENT DOCUMENTS

EP   0395895 B1   6/1993

(Continued)

OTHER PUBLICATIONS

The International Search Report and Written Opinion mailed Nov. 27, 2009, in related International Application No. PCT/US2009/058407.
The International Search Report and Written Opinion mailed Aug. 3, 2009 in International Application No. PCT/US2009/044516.
The International Search Report and Written Opinion mailed Nov. 27, 2009 in International Application No. PCT/US2009/058444.
International Preliminary Report on Patentability mailed Sep. 9, 2010 in International Patent Application No. PCT/US2009/044516.

(Continued)

*Primary Examiner* — Nathan M Nutter
(74) *Attorney, Agent, or Firm* — Faegre Baker Daniels

(57) ABSTRACT

A fluoropolymer coating composition that may be applied over a primer and/or at least one midcoat in a non-stick coating system. The coating composition may be prepared and applied in the form of a liquid dispersion, and includes at least one fluoropolymer base component, such as polytetrafluoroethylene (PTFE) and, in particular, at least one high molecular weight PTFE (HPTFE). The coating composition additionally includes a blended fluoropolymer composition. The blended fluoropolymer composition is a blend of at least one low molecular weight PTFE (LPTFE) and at least one melt-processible fluoropolymer. After application directly to a substrate or over an underlying coating, the coating demonstrates improved abrasion and scratch resistance, as well as improved release characteristics, as compared to known coatings that include only HPTFE or HPTFE with a small amount of melt processible fluoropolymer.

39 Claims, 19 Drawing Sheets

U.S. PATENT DOCUMENTS

| | | | |
|---|---|---|---|
| 7,026,036 B2 | 4/2006 | Leech et al. |
| 7,030,191 B2 | 4/2006 | Namura |
| 7,041,021 B2 | 5/2006 | Gibson et al. |
| 7,160,623 B2 | 1/2007 | Smith et al. |
| 7,220,483 B2 | 5/2007 | Coates et al. |
| 7,276,287 B2 | 10/2007 | Smith et al. |
| 7,291,678 B2 | 11/2007 | Namimatsu et al. |
| 7,594,962 B2 | 9/2009 | Bujard et al. |
| 7,625,973 B2 | 12/2009 | Ambrose et al. |
| 2001/0018493 A1 | 8/2001 | Lee et al. |
| 2001/0048179 A1 | 12/2001 | Stewart et al. |
| 2004/0109943 A1 | 6/2004 | Matsushima et al. |
| 2004/0242783 A1 | 12/2004 | Yabu et al. |
| 2004/0253387 A1 | 12/2004 | Cavero |
| 2005/0106325 A1 | 5/2005 | Nishio |
| 2006/0122333 A1 | 6/2006 | Nishio |
| 2006/0148971 A1 | 7/2006 | Jing et al. |
| 2006/0180936 A1 | 8/2006 | Japp et al. |
| 2006/0189719 A1 | 8/2006 | Ambrose et al. |
| 2006/0293459 A1 | 12/2006 | Yoshimoto et al. |
| 2007/0004848 A1 | 1/2007 | Hintzer et al. |
| 2007/0106026 A1 | 5/2007 | Namura |
| 2007/0117929 A1 | 5/2007 | Burch et al. |
| 2007/0117930 A1 | 5/2007 | Venkataraman et al. |
| 2007/0255012 A1 | 11/2007 | Smith et al. |
| 2009/0317553 A1 | 12/2009 | Harvey et al. |
| 2010/0080955 A1 | 4/2010 | Harvey et al. |
| 2010/0080959 A1 | 4/2010 | Harvey et al. |

FOREIGN PATENT DOCUMENTS

| | | | |
|---|---|---|---|
| EP | 0322877 B1 | 3/1994 |
| EP | 1746130 A1 | 1/2007 |
| EP | 1839846 A1 | 10/2007 |
| GB | 2434152 A | 7/2007 |
| GB | 2451097 A | 1/2009 |
| JP | 2005-320398 A | 11/2005 |
| JP | 2007070538 A | 3/2007 |
| WO | WO00/58389 A1 | 10/2000 |
| WO | WO2006/045753 A1 | 5/2006 |
| WO | WO2007/050247 A2 | 5/2007 |
| WO | WO2007/061915 A2 | 5/2007 |
| WO | WO2007/080426 A1 | 7/2007 |
| WO | WO2009/010739 A1 | 1/2009 |
| WO | WO2009/010740 A1 | 1/2009 |
| WO | WO2010/036911 A1 | 4/2010 |
| WO | WO2010/036935 A1 | 4/2010 |
| WO | WO2011/025902 A1 | 3/2011 |
| WO | WO2011/130154 A1 | 10/2011 |

OTHER PUBLICATIONS

Lewis, Sr. R., Hawley's Condensed Chemical Dictionary, 2007, p. 1197.

McKeen, L. Fluorinated Coatings and Finishes Handbook—The Definitive User's Guide and Databook, 2006, William Andrew Publishing/Plastics Design Library, pp. 15-36.

The International Search Report and Written Opinion mailed Oct. 24, 2008 in parent application No. PCT/GB2008/002414.

The British Search Report mailed Sep. 19, 2007 in priority application No. GB0713893.6.

The International Preliminary Report on Patentability mailed Jan. 28, 2010 in parent application No. PCT/GB2008/002414.

Applicant's response to the Examination Report dated Jun. 11, 2010 filed on Oct. 15, 2010 in European Application No. 08775953.6.

European Examination report issued May 31, 2011 in European Application No. 08775953.6.

Written Opinion and International Search Report mailed Jul. 13, 2011 from the International Searching Authority in related International Application No. PCT/US2011/031909.

Bivariate Fit of dry egg release test rating (1-5, with 5 best) vs. HPTFE content (in dry solids wt.% based on total fluoropolymer content)

Bivariate Fit of reciprocating abrasion test (wet RAT cycles/μm DFT) vs. HPTFE content (in dry solids wt.% based on total fluoropolymer content)

Bivariate Fit of mechanical scratch adhesion test rating (1-9, with 9 best) vs. HPTFE content (in dry solids wt.% based on total fluoropolymer content)

Bivariate Fit of 60° gloss vs. HPTFE content (in dry solids wt.% based on total fluoropolymer content)

Bivariate Fit of contact angle (°) vs. HPTFE content (in dry solids wt.% based on total fluoropolymer content)

Bivariate Fit of dry egg release test rating (1-5, with 5 best) vs. LPTFE content (in dry solids wt.% based on total fluoropolymer content)

Bivariate Fit of reciprocating abrasion test (wet RAT cycles/μm DFT) vs. LPTFE content (in dry solids wt.% based on total fluoropolymer content)

Bivariate Fit of mechanical scratch adhesion test rating (1-9, with 9 best) vs. LPTFE content (in dry solids wt.% based on total fluoropolymer content)

Bivariate Fit of contact angle (°) vs. LPTFE content (in dry solids wt.% based on total fluoropolymer content)

Bivariate Fit of 60° gloss vs. HPTFE content (in dry solids wt.% based on total fluoropolymer content)

Bivariate Fit of dry egg release test rating (1-5, with 5 best) vs. MPF content (in dry solids wt.% based on total fluoropolymer content)

Bivariate Fit of reciprocating abrasion test (wet RAT cycles/μm DFT) vs. MPF content (in dry solids wt.% based on total fluoropolymer content)

Bivariate Fit of mechanical scratch adhesion test rating (1-9, with 9 best) vs. MPF content (in dry solids wt.% based on total fluoropolymer content)

Bivariate Fit of 60° gloss vs. MPF content (in dry solids wt.% based on total fluoropolymer content)

Bivariate Fit of contact angle (°)vs. MPF content (in dry solids wt.% based on total fluoropolymer content)

Contour Plot for (M) Dry Egg Release (DER)

Contour Plot for (N) Burnt Milk Test

US 8,349,434 B2

BLENDED FLUOROPOLYMER COATINGS FOR RIGID SUBSTRATES

CROSS-REFERENCE TO RELATED APPLICATIONS

This application is a Divisional of U.S. patent application Ser. No. 12/567,330 filed Sep. 25, 2009 and entitled BLENDED FLUOROPOLYMER COATINGS FOR RIGID SUBSTRATES, which application claims the benefit under Title 35, U.S.C. §119(e) of U.S. Provisional Patent Application Ser. No. 61/100,311, entitled BLENDED FLUOROPOLYMER COMPOSITIONS, filed on Sep. 26, 2008; U.S. Provisional Patent Application Ser. No. 61/109,950, entitled FLUOROPOLYMER TOPCOATS INCLUDING BLENDED FLUOROPOLYMER ADDITIVES, filed on Oct. 31, 2008; U.S. Provisional Patent Application Ser. No. 61/145,433, entitled BLENDED FLUOROPOLYMER COMPOSITIONS, filed on Jan. 16, 2009; and U.S. Provisional Patent Application Ser. No. 61/145,875, entitled BLENDED FLUOROPOLYMER COMPOSITIONS, filed on Jan. 20, 2009, the disclosures of each are expressly incorporated by reference herein in their entirety.

BACKGROUND OF THE INVENTION

1. Field of the Invention

The present invention relates to fluoropolymers and, in particular, relates to fluoropolymer coatings, such as coatings of the type used on rigid substrates such as cookware or other applications in which a non-stick surface and/or abrasion resistant surface is desired. In particular, the present invention relates to a fluoropolymer coating having improved non-stick or release characteristics and/or improved abrasion resistance.

2. Description of the Related Art

Fluoropolymers are long-chain polymers comprising mainly ethylenic linear repeating units in which some or all of the hydrogen atoms are replaced with fluorine. Examples include polytetrafluoroethylene (PTFE), methylfluoroalkoxy (MFA), fluoro ethylene propylene (FEP), perfluoroalkoxy (PFA), poly(chlorotrifluoroethylene) and poly(vinylfluoride).

Non-stick coating systems including fluoropolymers are applied in single or multiple coats to the surface of a substrate to provide a coated substrate having a non-stick coating to which extraneous materials will not adhere. In a multiple layer coating system, the non-stick coating generally includes a primer and a topcoat, and optionally, one or more midcoats.

The use of non-stick coating systems which are applied to a substrate in multiple layers has been known for many years. The primers for such systems typically contain a heat resistant organic binder resin and one or more fluoropolymer resins, along with various opaque pigments and fillers. The midcoats contain mainly fluoropolymers with some amounts of opaque pigments, fillers and coalescing aids, while the topcoats are almost entirely composed of fluoropolymers, such as entirely high molecular weight polytetrafluoroethylene (HPTFE), or HPTFE with a small amount of a melt-processible fluoropolymer.

What is needed is a non-stick coating system that is an improvement over the foregoing.

SUMMARY OF THE INVENTION

The present invention provides a fluoropolymer coating composition that may be applied over a primer and/or at least one midcoat in a non-stick coating system. The coating composition may be prepared and applied in the form of a liquid dispersion, and includes at least one fluoropolymer base component, such as polytetrafluoroethylene (PTFE) and, in particular, at least one high molecular weight PTFE (HPTFE). The coating composition additionally includes a blended fluoropolymer composition. The blended fluoropolymer composition is a blend of at least one low molecular weight PTFE (LPTFE) and at least one melt-processible fluoropolymer. After application directly to a substrate or over an underlying coating, the coating demonstrates improved abrasion and scratch resistance, as well as improved release characteristics, as compared to known coatings that include only HPTFE or HPTFE with a small amount of melt processible fluoropolymer.

In one form thereof, the present invention provides a fluoropolymer coating composition, comprising: a fluoropolymer base component present in an amount of between 30 wt. % and 96 wt. % based on the total solids weight of all fluoropolymers in the coating composition, the fluoropolymer base component comprising at least one fluoropolymer including high molecular weight polytetrafluoroethylene (HPTFE) having a number average molecular weight ($M_n$) of at least 500,000; and a blended fluoropolymer composition present in an amount of between 4 wt. % and 70 wt. % based on the total solids weight of all fluoropolymers in the coating composition, the blended fluoropolymer composition comprising: at least one low molecular weight polytetrafluoroethylene (LPTFE) having a first melt temperature ($T_m$) of 335° C. or less; and at least one melt-processible fluoropolymer (MPF).

The fluoropolymer base component may be present in an amount of between 60 wt. % and 96 wt. % and the blended fluoropolymer composition is present in an amount of between 4 wt. % and 40 wt. % based on the total solids weight of all fluoropolymers in the coating composition. The at least one low molecular weight polytetrafluoroethylene (LPTFE) may be present in an amount between 2 wt. % and 15 wt. % and the at least one melt-processible fluoropolymer (MPF) is present in an amount of between 2 wt. % and 15 wt. % based on the total solids weight of all fluoropolymers in the coating composition.

The at least one melt-processible fluoropolymer may comprise perfluoroalkoxy (PFA) present in an amount between 20 wt. % and 85 wt. %, based on the total solids weight of the fluoropolymers in the blended fluoropolymer composition. The at least one melt-processible fluoropolymer may comprise perfluoroalkoxy (PFA) present in an amount between 37 wt. % and 65 wt. %, based on the total solids weight of the fluoropolymers in the blended fluoropolymer composition.

The at least one low molecular weight polytetrafluoroethylene (LPTFE) may have a mean particle size selected from the group consisting of 0.9 microns (μm) or less, 0.75 microns (μm) or less, 0.5 microns (μm) or less, 0.4 microns (μm) or less, 0.3 microns (μm) or less, and 0.2 microns (μm) or less. The at least one low molecular weight polytetrafluoroethylene (LPTFE) may have a first melt temperature ($T_m$) selected from the group consisting of 332° C. or less, 330° C. or less, 329° C. or less, 328° C. or less, 327° C. or less, 326° C. or less, and 325° C. or less. The at least one low molecular weight polytetrafluoroethylene (LPTFE) may be selected from the group consisting of: an LPTFE obtained via emulsion polymerization and without being subjected to agglomeration, thermal degradation, or irradiation, and has a mean particle size of 1.0 microns (μm) or less; an LPTFE micropowder obtained via emulsion polymerization with or without a subsequent molecular weight reduction step; and an LPTFE micropowder obtained via suspension polymerization with or without a subsequent molecular weight reduction step.

The at least one high molecular weight polytetrafluoroethylene (HPTFE) may include a modifying co-monomer in an amount less than 1 wt. % based on the weight of the high molecular weight polytetrafluoroethylene (HPTFE). The at least one melt-processible fluoropolymer (MPF) has a mean particle size of 1.0 microns (μm) or less.

In another form thereof, the present invention provides a coated article, comprising: a rigid substrate; and a coating on the rigid substrate, comprising: at least one high molecular weight polytetrafluoroethylene (HPTFE) having a number average molecular weight ($M_n$) of at least 500,000 and present in an amount of between 30 wt. % and 96 wt. % based on the total solids weight of all fluoropolymers in the coating composition; at least one low molecular weight polytetrafluoroethylene (LPTFE) having a number average molecular weight ($M_n$) of less than 500,000; and at least one melt-processible fluoropolymer (MPF).

The at least one fluoropolymer base component may be present in an amount of between 60 wt. % and 96 wt. % and the at least one low molecular weight polytetrafluoroethylene (LPTFE) and the at least one melt-processible fluoropolymer (MPF) are together present in an amount of between 4 wt. % and 40 wt. % based on the total solids weight of all fluoropolymers in the coating. The at least one low molecular weight polytetrafluoroethylene (LPTFE) may be present in an amount between 2 wt. % and 15 wt. % and the at least one melt-processible fluoropolymer (MPF) is present in an amount of between 2 wt. % and 15 wt. % based on the total solids weight of all fluoropolymers in the coating.

The at least one melt-processible fluoropolymer (MPF) may comprise perfluoroalkoxy (PFA) present in an amount between 20 wt. % and 85 wt. % based on the total solids weight of the at least one low molecular weight polytetrafluoroethylene (LPTFE) and the at least one melt-processible fluoropolymer (MPF). The at least one melt-processible fluoropolymer (MPF) may comprise perfluoroalkoxy (PFA) present in an amount between 37 wt. % and 65 wt. % based on the total solids weight of the at least one low molecular weight polytetrafluoroethylene (LPTFE) and the at least one melt-processible fluoropolymer (MPF).

The coating may have a contact angle of at least 110°, and/or a measured gloss of at least 25% reflectance at 60°, and/or a surface roughness (Ra) of less than 100 nm.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein:

FIGS. 1 and 2 correspond to Example 6, wherein:

FIG. 1 is a laser profilometer image of the control topcoat;

FIG. 2 is a laser profilometer image of a topcoat made in accordance with the present disclosure;

FIGS. 3-23 correspond to Topcoats 1-10 of Example 1, wherein:

FIG. 3 is a chart of egg release test rating vs. HPTFE content;

FIG. 4 is a chart of reciprocating abrasion test results vs. HPTFE content;

FIG. 5 is a chart of mechanical scratch adhesion test (MSAT) results vs. HPTFE content;

FIG. 6 is a chart of 60° gloss vs. HPTFE content;

FIG. 7 is a chart of contact angle vs. HPTFE content;

FIG. 8 is a chart of egg release test rating vs. LPTFE content;

FIG. 9 is a chart of reciprocating abrasion test results vs. LPTFE content;

FIG. 10 is a chart of mechanical scratch adhesion test (MSAT) results vs. LPTFE content;

FIG. 11 is a chart of contact angle vs. LPTFE content;

FIG. 12 is a chart of 60° gloss vs. LPTFE content;

FIG. 13 is a chart of egg release test rating vs. MPF content;

FIG. 14 is a chart of reciprocating abrasion test results vs. MPF content;

FIG. 15 is a chart of mechanical scratch adhesion test (MSAT) results vs. MPF content; and FIG. 16 is a chart of 60° gloss vs. MPF content;

FIG. 17 is a chart of contact angle vs. MPF content;

FIGS. 18-23 correspond to Example 8, wherein:

FIG. 18 is a contour plot of dry egg release test results plotted against LPTFE and MPF (PFA) content;

FIG. 19 is a contour plot of reciprocating abrasion test results plotted against LPTFE and MPF (PFA) content;

FIG. 20 is a contour plot of mechanical scratch adhesion test (MSAT) results plotted against LPTFE and MPF (PFA) content;

FIG. 21 is a contour plot of measured gloss plotted against LPTFE and MPF (PFA) content;

FIG. 22 is a contour plot of measured contact angle plotted against LPTFE and MPF (PFA) content;

FIG. 23 is a contour plot of the normalized results of the dry egg release test results, the reciprocating abrasion test results, the mechanical scratch adhesion test (MSAT) results, the measured gloss, and the measured contact angle, plotted against LPTFE and MPF (PFA) content;

FIGS. 24-35 correspond to the test results for the topcoats of Example 9, wherein:

FIG. 24 is a contour plot of the dry egg release test plotted against LPTFE and MPF (PFA) content;

FIG. 25 is a contour plot of the burnt milk test plotted against LPTFE and MPF (PFA) content;

FIG. 26 is a contour plot of measured gloss plotted against LPTFE and MPF (PFA) content;

FIG. 27 is a contour plot of measured contact angle plotted against LPTFE and MPF (PFA) content;

FIG. 28 is a contour plot of the reciprocating abrasion test of topcoats applied over Basecoat A plotted against LPTFE and MPF (PFA) content;

FIG. 29 is a contour plot of the reciprocating abrasion test of topcoats applied over Basecoat B plotted against LPTFE and MPF (PFA) content;

FIG. 30 is a contour plot of the mechanical scratch adhesion test (MSAT) results of topcoats applied over Basecoat A plotted against LPTFE and MPF (PFA) content;

FIG. 31 is a contour plot of the mechanical scratch adhesion test (MSAT) results of topcoats applied over Basecoat B plotted against LPTFE and MPF (PFA) content;

FIG. 32 is a contour plot of normalized abrasion test results plotted against LPTFE and MPF (PFA) content;

FIG. 33 is a contour plot of normalized release test results plotted against LPTFE and MPF (PFA) content;

FIG. 34 is a contour plot of normalized surface properties plotted against LPTFE and MPF (PFA) content; and FIG. 35 is a contour plot of normalized abrasion test results, release test results, and surface properties plotted against LPTFE and MPF (PFA) content.

Figure 1:
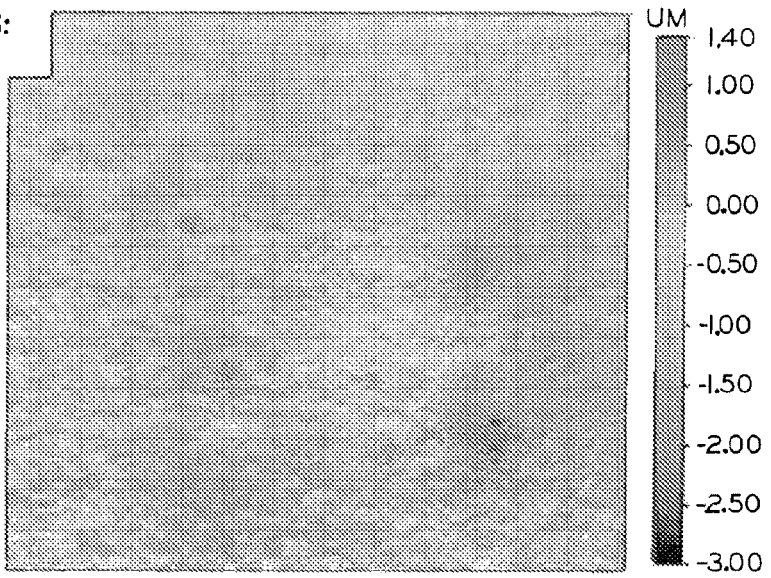

The exemplifications set out herein illustrate embodiments of the invention, and such exemplifications are not to be construed as limiting the scope of the invention in any manner.

DETAILED DESCRIPTION

The present invention provides a fluoropolymer coating composition that may be applied over a primer and/or at least one midcoat in a non-stick coating system. The coating composition may be prepared and applied in the form of a liquid dispersion, and includes at least one fluoropolymer base component, such as polytetrafluoroethylene (PTFE) and, in particular, at least one high molecular weight PTFE (HPTFE). The coating composition additionally includes a blended fluoropolymer composition. The blended fluoropolymer composition is a blend of at least one low molecular weight PTFE (LPTFE) and at least one melt-processable fluoropolymer. After application directly to a substrate or over an underlying coating, the coating demonstrates improved abrasion and scratch resistance, as well as improved release characteristics, as compared to known coatings that include only HPTFE or HPTFE with a small amount of melt processable fluoropolymer.

In one embodiment, the present coating composition is applied over an underlying coating, or undercoat. The undercoat may be a basecoat, which is the coating applied directly to an underlying substrate (sometimes referred to as a primer), optionally together with one or more midcoats. In these embodiments, the present coating is referred to herein as either an "overcoat" or a "topcoat" and these terms are generally interchangeable. In other embodiments, the present coating composition may be applied directly to a substrate to form a coating in direct contact with the substrate whereby the coating is not applied over any undercoats. In further embodiments, the present coating system may itself also be an undercoat.

The present coating composition generally includes at least one fluoropolymer base component and a blended fluoropolymer composition. The fluoropolymer base component is typically a high molecular weight PTFE (HPTFE). The blended fluoropolymer composition includes at least one low molecular weight PTFE (LPTFE) and at least one melt processible fluoropolymer (MPF).

I. Fluoropolymer Base Components

The fluoropolymer base component includes at least one fluoropolymer, such as polytetrafluoroethylene (PTFE), co-polymers of tetrafluoroethlyene and ethylene (ETFE), co-polymers of tetrafluoroethlyene and perfluoro(alkyl vinyl ethers) (PAVE), co-polymers of tetrafluoroethlyene and perfluoro(ethyl vinyl ether) (PEVE), co-polymers of tetrafluoroethylene and perfluoro(propyl vinyl ether) (PPVE), co-polymers of tetrafluoroethlyene and perfluoro(methyl vinyl ether) (PMVE), co-polymers of tetrafluoroethylene and hexafluoropropylene (FEP), co-polymers of tetrafluoroethylene and perfluorovinylether (PFA) and polyvinylidene fluoride (PVDF), and co-polymers of tetrafluoroethylene, hexafluoropropylene, and vinylidene difluoride (THV), and other perfluorinated polymers. Fluoroelastomers based on PTFE may also be used.

Typically, the fluoropolymer base component will be one or more perfluorinated fluoropolymers and, in particular, will be one or more traditional high molecular weight PTFE (HPTFE) components.

The number average molecular weight ($M_n$) of the HPTFE is typically at least 500,000 or more, and may be at least 1,000,000 or more, and suitable HPTFE in the form of liquid dispersions and/or powders are available from many commercial sources. Liquid HPTFE dispersions typically include surfactants for stability, though "unstabilized" HPTFE dispersions, typically having less than 1.0 wt. % surfactant, are also available and may also be used. When a powder is used, the powder will typically be dispersed in a liquid to prepare the coating composition.

In some embodiments, the HPTFE may include a small amount of modifying co-monomer, in which case the HPTFE is a co-polymer known in the art as "modified PTFE" or "trace modified PTFE". Examples of the modifying co-monomer include perfluoropropylvinylether (PPVE), other modifiers, such as hexafluoropropylene (HFP), chlorotrifluoroethylene (CTFE), perfluorobutylethylene (PFBE), or other perfluoroalkylvinylethers, such as perfluoromethylvinylether (PMVE) or perfluoroethylvinylether (PEVE). The modifying co-monomer will typically be present in an amount less than 1% by weight, for example, based on the weight of the HPTFE.

II. Blended Fluoropolymer Compositions

The blended fluoropolymer composition generally includes at least one low molecular weight PTFE (LPTFE) and at least one melt processable fluoropolymer. Suitable fluoropolymer components and blends are discussed below, and are also discussed in U.S. patent application Ser. No. 12/468,580, entitled "Blended Fluoropolymer Compositions", filed on May 19, 2009, assigned to the assignee of the present invention, the disclosure of which is expressly incorporated by reference herein.

A. Low Molecular Weight Polytetrafluoroethylene (LPTFE)

The first fluoropolymer of the present blended fluoropolymer composition may be a liquid dispersion of polytetrafluoroethylene (PTFE) and, in particular, may be a liquid dispersion of a PTFE having a low molecular weight (LPTFE) and/or optionally other properties as discussed in detail below.

The liquid dispersion of LPTFE in most embodiments will be an aqueous dispersion, though the LPTFE may be dispersed in other solvents and/or LPTFE originally in an aqueous phase may be phase transferred into another solvent, such as organic solvents including hexane, acetone, or an alcohol.

The LPTFE, when produced as described above, will typically have a mean particle size of 1.0 microns ($\mu m$) or less, 0.9 microns ($\mu m$) or less, 0.75 microns ($\mu m$) or less, 0.5 microns ($\mu m$) or less, 0.4 microns ($\mu m$) or less, 0.3 microns ($\mu m$) or less, or 0.2 microns ($\mu m$) or less, as measured by a suitable manner such as by laser light diffraction by ISO 13320. In some embodiments, the LPTFE may have a mean particle size as low as 30, 50, 100, or 150 nm, or as large as 200, 250, or 350 nm, for example.

The number average molecular weight ($M_n$) of the LPTFE will typically be less than 500,000 and, in most embodiments, may be as low as 10,000 or greater, 20,000 or greater, or 25,000 or greater, or may be as high as 200,000 or less, 100,000 or less, or 70,000 or less, 60,000 or less, or 50,000 or less, for example.

An alternative manner of characterizing the molecular weight of the LPTFE is by its first melt temperature ($T_m$), as determined by a suitable method such as differential scanning calorimetry (DSC), which first melt temperature ($T_m$) for LPTFE may be either equal to or less than 335° C. In other embodiments, the first melt temperature of the LPTFE may be either equal to or less than 332° C., either equal to or less than 330° C., either equal to or less than 329° C., either equal to or less than 328° C., either equal to or less than 327° C., either equal to or less than 326° C., or either equal to or less than 325° C.

The LPTFE may be provided in the form of an aqueous dispersion which is stabilized, unstabilized, or minimally stabilized. As used herein, "unstabilized" or "minimally stabilized" refers to an aqueous dispersion that includes less than 1.0 wt. % of a traditional surfactant, such as non-ionic surfactant or an anionic surfactant, based on the weight of the LPTFE aqueous dispersion. In some embodiments, the LPTFE dispersion may be provided in the form of an aqueous dispersion having less than 1.0 wt. % surfactant, less than 0.8 wt. % surfactant, less than 0.6 wt. % surfactant, or even less than 0.5 wt. % surfactant. In other embodiments, the LPTFE dispersion may be provided in the form of an aqueous dispersion that is "stabilized", typically having 1-12 wt. % surfactant. However, the nature of the stabilization package employed is not a critical feature of this invention.

Also, as discussed below, the LPTFE may be provided in the form of a solid micropowder.

The LPTFE will typically be in the form of a low molecular weight PTFE homopolymer. However, in other embodiments, the LPTFE may include a small amount of modifying co-monomer, in which case the PTFE is a co-polymer known in the art as "modified PTFE" or "trace modified PTFE". Examples of the modifying co-monomer include perfluoropropylvinylether (PPVE), other modifiers, such as hexafluoropropylene (HFP), chlorotrifluoroethylene (CTFE), perfluorobutylethylene (PFBE), or other perfluoroalkylvinylethers, such as perfluoromethylvinylether (PMVE) or perfluoroethylvinylether (PEVE). The modifying co-monomer will typically be present in an amount less than 1% by weight, for example, with respect to the PTFE.

Suitable LPTFE dispersions include SFN-D, available from Chenguang R.I.C.I, Chengdu, 610036 P.R. China, as well as TE3877N, available from DuPont. Other exemplary LPTFE micropowders include Dyneon TF-9207, available from Dyneon LLC, LDW-410, available from Daikin Industries, Inc., and MP-25, MP-55, MP-8T and UF BTA, each available from Laurel Products.

These fluoropolymers have characteristics set forth in Table 1 below:

TABLE 1

Characteristics of exemplary low molecular weight polytetrafluoroethylenes (LPTFE)

| LPTFE | Solids content (wt. %) | Molecular weight (Mn) (estimated) | Mean particle size (μm) | Surfactant (wt. %, based on weight of LPTFE) (type) | First melt temperature (DSC) (° C.) |
|---|---|---|---|---|---|
| SFN-D | 50 | 10,000-20,000 | 0.19 | 5% | 324.5-326 |
| TE3877N | 60 | 65,000-70,000 | 0.2 | 6% (non-ionic) | 327.6 |
| LDW-410 | 40 | 80,000-90,000 | 0.2 | 5% | 329.4 |
| TF-9207 | 100 | 65,000-70,000 | 13.27 | N/A | 327.6 |
| MP-8T | 100 | ca. 25,000 | 1.32 | N/A | 323.1 |
| MP-10 | 100 | 100,000 | 0.84 | N/A | 330 |
| MP-55 | 100 | 40,000-50,000 | 11.06 | N/A | 324.3 |
| MP-25 | 100 | ca. 130,000 | 0.28 | N/A | 332 |
| UF-8TA | 100 | ca. 95,000 | 1.22 | N/A | 331.5 |

Exemplary types of LPTFE that may be used in the present invention are discussed below.

i. LPTFE Produced by Dispersion Polymerization or Emulsion Polymerization and which is Thereafter not Agglomerated, Irradiated, or Thermally Degraded In a first embodiment of the present invention, the LPTFE is produced by a polymerization process that is well known in the art as dispersion polymerization or emulsion polymerization. These polymerization processes may be conducted with chain transfer agents, which reduce the average molecular weight of the fluoropolymers produced, and/or via other methods whereby the polymerization process is controlled to form a liquid dispersion of directly polymerized particles of PTFE having low molecular weight (LPTFE).

In these embodiments, the LPTFE, after being produced by dispersion polymerization or emulsion polymerization, is thereafter not agglomerated, irradiated, or thermally degraded. In particular, the LPTFE has not been subjected to any agglomeration steps during its manufacture, and therefore retains a small mean particle size. Further, the LPTFE has not been subjected to thermal degradation to reduce its molecular weight. Still further, the LPTFE has also not been subjected to irradiation, such as by high energy electron beam, to reduce its molecular weight. In these embodiments, the LPTFE dispersions will not demonstrate a spectrum and/or will be below a detection limit when subjected to electron paramagnetic resonance (EPR) or electron spin resonance (ESR) spectroscopy, as opposed to irradiated PTFE, which will demonstrate such a spectra and/or will otherwise have detectable free radicals.

These types of LPTFE dispersions are provided as aqueous dispersions that are obtained via a controlled dispersion or emulsion polymerization process to produce directly polymerized LPTFE that is not thereafter subjected to agglomeration, thermal degradation, or irradiation. These types of LPTFE dispersions will be appreciated by those of ordinary skill in the art to be distinct from other PTFE materials that are commercially available.

First, these types of LPTFE dispersions are distinct from PTFE that is produced by the polymerization process well known in the art as granular or suspension polymerization, which yields PTFE known in the art as granular PTFE resin or granular PTFE molding powder. Granular PTFE resins will typically have a high molecular weight, such as a number average molecular weight ($M_n$) of at least 1,000,000 or more and a first melt temperature ($T_m$) greater than the 335° C., typically much greater than 335° C. Granular PTFE resin is typically provided in solid, powder form including particles having a mean particle size of several microns, typically from 10 to 700 microns (μm). These resins may also be provided as fine cut resins having a mean particle size of 20 to 40 microns (μm), for example.

Additionally, these types of LPTFE dispersions may be distinct from lower molecular weight materials prepared from high molecular weight granular PTFE resins that have been degraded by irradiation or thermal degradation to form low molecular weight materials known as granular PTFE micropowders, which typically have a particle size ranging between 0.2 and 20 microns (μm). Examples of granular PTFE micropowders include Zonyl® MP1200, MP1300, and MP1400 resins, available from DuPont (Zonyl® is a registered trademark of E.I. du Pont de Nemours & Co.).

Second, these types of LPTFE dispersions are also distinct from high molecular weight PTFE dispersions made from dispersion or emulsion polymerization conducted without chain transfer agents to thereby polymerize a high molecular weight PTFE having a number average molecular weight ($M_n$) of at least 1,000,000 or more, and a first melt temperature ($T_m$) greater than the 335° C., typically much greater than 335° C. These high molecular weight PTFE dispersions are typically stabilized with a traditional surfactant present in an amount greater than 1.0 wt. %, typically much greater than 1.0 wt. %.

Additionally, these types of LPTFE dispersions are also distinct from high molecular weight PTFE dispersions that are produced via dispersion or emulsion polymerization and thereafter coagulated or agglomerated.

Still further, these types of LPTFE dispersions are distinct from high molecular weight PTFE dispersions that are produced via dispersion or emulsion polymerization and thereafter coagulated or agglomerated, and then are subjected to thermal degradation or irradiation to form low molecular weight PTFE powders, known in the art as PTFE micropowders, which are provided as solid powders having a particle size between 0.2 and 20 microns (µm), such as for use in extrusion and other applications. Examples of PTFE micropowders include Zonyl® MP1000, MP1100, MP1500 and MP1600 resins, available from DuPont (Zonyl® is a registered trademark of E.I. du Pont de Nemours & Co.). However, as discussed below, these types of LPTFE micropowders may also be used in a second embodiment of the present invention.

Third, these types of LPTFE dispersions are distinct from LPTFE micropowders that are polymerized via dispersion or emulsion polymerization in the presence of chain transfer agents, and then are agglomerated to form PTFE micropowders having an average particle size of between 0.2 and 20 microns (µm), for example.

ii. LPTFE Micropowders

In a second embodiment of the present invention, the LPTFE may be in the form of an LPTFE micropowder.

A first type of LPTFE micropowders are derived from high molecular weight PTFE dispersions that are produced via dispersion or emulsion polymerization and thereafter coagulated or agglomerated, and then subjected to thermal degradation or irradiation to form low molecular weight PTFE powders, known in the art as PTFE micropowders and referred to herein as LPTFE micropowders, which are typically provided as solid powders having a particle size typically between 0.2 and 20 microns (µm).

Examples of these types of LPTFE micropowders include Zonyl® MP1000, MP1100, MP1500 and MP1600 resins, available from DuPont (Zonyl® is a registered trademark of E.I. du Pont de Nemours & Co.); and MP-10, MP-25, MP-55 and UF-8TA, each available from Laurel Products.

A second type of LPTFE micropowders are derived from high molecular weight granular PTFE resins that have been degraded by irradiation or thermal degradation to form low molecular weight materials known as granular PTFE micropowders, which typically have a particle size ranging typically between 2 and 20 microns (µm).

Examples of these types of LPTFE micropowders include Zonyl® MP1200, MP1300, and MP1400 resins, available from DuPont (Zonyl® is a registered trademark of E.I. du Pont de Nemours & Co.) and MP-8T and MP-10, available from Laurel Products.

A third type of these types LPTFE micropowders are polymerized via dispersion or emulsion or suspension polymerization in the presence of chain transfer agents, and then may be agglomerated to form LPTFE micropowders having an average particle size of typically between 0.2 and 20 microns (µm), for example.

B. Melt Processible Fluoropolymers (MPF)

The second fluoropolymer of the blended fluoropolymer composition may be a liquid dispersion of one or more melt processible fluoropolymers (MPF), such as perfluoroalkoxy (PFA) (copolymers of tetrafluoroethylene (TFE) and perfluoroalkylvinyl ethers), including methylfluoroalkoxy (MFA) (a copolymer of tetrafluoroethylene (TFE) and perfluoromethylvinyl ether (PMVE)) and ethylfluoroalkoxy (EFA) (a copolymer of tetrafluoroethylene (TFE) and perfluoroethylvinyl ether (PEVE)); and fluorinated ethylene propylene (FEP), for example.

The MPF may be produced by a polymerization process that is well known in the art as dispersion polymerization or emulsion polymerization. These polymerization processes may be conducted with chain transfer agents, which reduce the average molecular weight of the fluoropolymers produced, and/or via other methods whereby the polymerization process is controlled to form a liquid dispersion of directly polymerized particles of MPF.

In most embodiments, the MPF, after being produced by dispersion polymerization or emulsion polymerization, is thereafter not agglomerated, irradiated, or thermally degraded. In particular, the MPF will not have been subjected to any agglomeration steps during its manufacture, and therefore retains a small mean particle size as described below.

The liquid dispersion of MPF in most embodiments will be an aqueous dispersion, though the MPF may be dispersed in other solvents and/or MPF originally in an aqueous phase may be phase transferred into another solvent, such as organic solvents including hexane, acetone, or an alcohol.

The MPF, when produced as described above, will typically have a mean particle size of 1.0 microns (µm) or less, 0.9 microns (µm) or less, 0.75 microns (µm) or less, 0.5 microns (µm) or less, 0.4 microns (µm) or less, 0.3 microns (µm) or less, or 0.2 microns (µm) or less. In particular, the MPF may have a mean particle size as low as 30, 50, 100, or 150 nm, or as large as 200, 250, or 350 nm, for example.

In other embodiments, MPF powders could also be used.

The MPF may be provided in the form of an aqueous dispersion which is stabilized, unstabilized, or minimally stabilized. As used herein, "unstabilized" or "minimally stabilized" refers to an aqueous dispersion that includes less than 1.0 wt. % of a traditional surfactant, such as non-ionic surfactant or an anionic surfactant, based on the weight of the MPF aqueous dispersion. In some embodiments, the MPF dispersion may be provided in the form of an aqueous dispersion having less than 1.0 wt. % surfactant, less than 0.8 wt. % surfactant, less than 0.6 wt. % surfactant, or even less than 0.5 wt. % surfactant. In other embodiments, the MPF dispersion may be provided in the form of an aqueous dispersion that is "stabilized", typically having 1-12 wt. % surfactant.

Typically, the melt flow rate (MFR) of the MPF will be greater than 0.5 g/10 min and, in one embodiment, may be about 2 g/10 min of higher, as determined by ASTM D1238.

Also, the MPF will typically have a co-monomer content, i.e., a content of one or more monomers other than tetrafluoroethylene (TFE), of about 3.0 wt. % or greater, such as 4.0 wt. % or greater, 4.5 wt. % or greater, 5.0 wt. % or greater, 5.5 wt. % or greater, or 6.0 wt. % or greater.

Suitable MPF dispersions include TE7224 (PFA), available from DuPont, 6900Z (PFA), available from Dyneon LLC, TE9568 (FEP), available from DuPont, Neoflon ND-110 (FEP), available from Daikin, and Hyflon XPH 6202-1 (MFA), available from Solvay. These MPF dispersions have characteristics set forth in Table 2 below:

TABLE 2

Characteristics of exemplary melt processible fluoropolymers (MPF)

| MPF (type) | Solids content (wt. %) | Mean particle size (μm) | Melt flow rate (MFR) (g/10 min) | First melt temperature (DSC) (° C.) |
|---|---|---|---|---|
| DuPont TE7224 (PFA) | 58.6 | 0.26 | 2.4 | 313.0 (shoulder 321.2) |
| Dyneon 6900Z (PFA) | 49.4 | 0.31 | 19.4 | 310.25 |
| DuPont TE9568 (FEP) | 55.6 | 0.17 | 11.9 | 257.84 |
| Daikin Neoflon ND-110 (FEP) | 56.5 | 0.16 | — | 232.83 |
| Solvay Hyflon XPH 6202-1 (MFA) | 27.2 | 0.28 | 4.5 | 306.31 (shoulder 287.29) |

To form the blended fluoropolymer composition compositions of the present invention, a LPTFE liquid dispersion and a MPF liquid dispersion are blended together. When liquid dispersions are used, the dispersions may have varying solids contents, and one of ordinary skill in the art will recognize that the wet weights of the liquid LPTFE and MPF dispersions may be selected based on the solids contents of the dispersions and the desired relative weight percent ratio of the LPTFE and MPF that is desired in the resulting blended compositions.

Notably, because the LPTFE and the MPF are provided in the form of liquid dispersions having the small mean particle sizes set forth above, upon blending of the dispersions particles of the LPTFE and MPF are brought into contact with each other at the submicron level, prior to later processing steps in which the dispersions are dried or melted, for example. As discussed above, the LPTFE and MPF are not agglomerated prior to blending, such that the submicron interaction of the LPTFE and MPF is thought to facilitate the formation of a specific crystalline form of the dried or cured fluoropolymer blend that is believed to be important to achieving the beneficial results obtained with the present blended compositions.

The relative ratios, fractions, or weight percents of the LPTFE and MPF in the blended fluoropolymer composition compositions described below are based on the total solids weight of the LPTFE and MPF fluoropolymers, excluding other fluoropolymers other than LPTFE and MPF as well as non-fluoropolymer components that may be present, such as water or other solvents, surfactants, pigments, fillers, and other compositions.

The LPTFE may comprise as little as 5 wt. %, 10 wt. %, or 15 wt. %, or as much as 85 wt. %, 90 wt. %, or 95 wt. % by weight of the blended fluoropolymer composition and, in other embodiments, the LPTFE may comprise between 40 wt. % and 60 wt. % of the blended composition, between 45 wt. % and 55 wt. % of the blended composition, or about 50 wt. % of the blended fluoropolymer composition. Thus, the MPF may comprise as much as 85 wt. %, 90 wt. %, or 95 wt. %, or as little as 5 wt. %, 10 wt. %, or 15 wt. % by weight of the blended fluoropolymer composition and, in other embodiments, the MPF may comprise between 60 wt. % and 40 wt. % of the blended composition, between 55 wt. % and 45 wt. % of the blended composition, or about 50 wt. % of the blended fluoropolymer composition.

Blends of LPTFE and MFA may include, in one embodiment, from 35 wt. % to 90 wt. % MFA and from 10 wt. % to 65 wt. % LPTFE. In another embodiment, such blends may include from 35 wt. % to 76 wt. % MFA and from 24 wt. % to 65 wt. % LPTFE. In another embodiment, such blends may include from 56 wt. % to 76 wt. % MFA and from 24 wt. % to 44 wt. % LPTFE. In another embodiment, such blends may include from 63 wt. % to 70 wt. % MFA and from 30 wt. % to 37 wt. % LPTFE. In a further embodiment, such blends may include 67 wt. % MFA and 33 wt. % LPTFE.

Blends of LPTFE and FEP may include, in one embodiment, from 25 wt. % to 90 wt. % FEP and from 10 wt. % to 75 wt. % LPTFE. In another embodiment, such blends may include from 35 wt. % to 90 wt. % FEP and from 10 wt. % to 65 wt. % LPTFE. In another embodiment, such blends may include either from 35 wt. % to 55 wt. % FEP and from 45 wt. % to 65 wt. % LPTFE, or from 60 wt. % to 90 wt. % FEP and from 10 wt. % to 40 wt. % LPTFE. In another embodiment, such blends may include either from 40 wt. % to 50 wt. % FEP and from 50 wt. % to 60 wt. % LPTFE, or from 75 wt. % to 85 wt. % FEP and from 15 wt. % to 25 wt. % LPTFE. In a further embodiment, such blends may include either 50 wt. % FEP and 50 wt. % LPTFE, or 75 wt. % FEP and 25 wt. % LPTFE.

Blends of LPTFE and PFA may include, in one embodiment, from 37 wt. % to 80 wt. % PFA and from 20 wt. % to 63 wt. % LPTFE. In another embodiment, such blends may include from 37 wt. % to 65 wt. % PFA and from 35 wt. % to 63 wt. % LPTFE. In another embodiment, such blends may include from 43 wt. % to 63 wt. % PFA and from 37 wt. % to 57 wt. % LPTFE. In another embodiment, such blends may include from 50 wt. % to 60 wt. % PFA and from 40 wt. % to 50 wt. % LPTFE. In a further embodiment, such blends may include 53 wt. % PFA and 47 wt. % LPTFE.

III. Forming and Applying the Coating Compositions

To form the present coating composition, aqueous dispersions of the components of the present coating composition may be blended in any order with slow stirring, for example, or via another low or medium shear method which minimizes the potential for agglomeration, coagulation, or fibrillation of the fluoropolymer particles. When liquid dispersions are used, the dispersions may have varying solids contents, and one of ordinary skill in the art will recognize that the wet weights of the liquid HPTFE, LPTFE and MPF dispersions may be selected based on the solids contents of the dispersions and the desired relative weight percent ratios of the HPTFE, LPTFE and MPF that are desired in the resulting blended compositions.

The present coating compositions may also include auxiliary components or compositions, such as fillers, reinforcement compositions, pigments, and film formers, if desired, depending on the end use application of the coating compositions. The present coating compositions may be applied to rigid substrates, such as cookware, bakeware, molds, small electrical appliances, fasteners, reprographic rollers, and other applications.

In one embodiment, based on the solids content of all fluoropolymer components of the present coating compositions, the fluoropolymer base component is present in an amount of as little as 30 wt. %, 35 wt. %, 40 wt. %, 45 wt. %, 55 wt. %, 60 wt. %, or 70 wt. %, or as great as 80 wt. %, 90 wt. %, 95 wt. %, or 96 wt. %, or within a range defined between any pair of the foregoing values, with the blended fluoropolymer composition present in an amount of as little as 4 wt. %, 5 wt. %, 10 wt. %, or 20 wt. %, or as great as 30 wt. %, 40 wt. %, 45 wt. %, 55 wt. %, 60 wt. %, 65 wt. % or 70 wt. % within a range defined between any pair of the foregoing values.

In particular embodiments, the HPTFE may be present in an amount of between 75 wt. % and 95 wt. %, between 80 wt. % and 95 wt. %, between 85 wt. % and 95 wt. %, or between 90 wt. % and 95 wt. %, based on the solids content of all fluoropolymer components of the present coating composition, with the blended LPTFE/MPF composition present in a corresponding amount of between 5 wt. % and 25 wt. %, between 5 wt. % and 20 wt. %, between 5 wt. % and 15 wt. %, or between 5 wt. % and 10 wt. %, based on the solids content of all fluoropolymer components of the present coating composition.

With respect to the amounts of LPTFE and MPF relative to one another, in particular embodiments, the LPTFE may be present in an amount of between 33 wt. % and 66 wt. %, between 40 wt. % and 60 wt. %, between 45 wt. % and 55 wt. %, or present in an amount of 50 wt. %, based on the combined solids content of the LPTFE and MPF components, with the MPF present in a corresponding amount of between 33 wt. % and 66 wt. %, between 40 wt. % and 60 wt. %, between 45 wt. % and 55 wt. %, or present in an amount of 50 wt. %, based on the combined solids content of the LPTFE and MPF components. In other words, the LPTFE/MPF ratio may be between 2:1 and 1:2, between 1.5:1 and 1:1.5, between 1.2:1 and 1:1.2, or may be 1:1 based on the combined solids content of the LPTFE and MPF components.

The coating composition can be prepared by any standard formulation technique such as simple addition and low shear mixing. The coating composition may be applied over a basecoat or primer and/or a midcoat by any known technique, and is then cured to provide a coated substrate with a coating having improvements in gloss, non-stick performance, and abrasion and scratch resistance. The particular compositions of the primer and/or midcoat may vary widely, and are not thought to be critical with respect to the improved properties demonstrated by the coatings disclosed herein.

The present coating compositions will typically be heat cured at a temperature of 400-430° C. for between 3 and 15 minutes, depending on the applied thickness and cure temperature. The present coatings are typically applied to a dry film thickness (DFT) of between 10 and 30 microns, depending on the application.

It has been found that blending of the dispersions facilitates interaction of the HPTFE, LPTFE and MPF on a submicron level to facilitate intimate blending such that, when the blended fluoropolymer composition is dried, a crystal structure representing a true alloy of the fluoropolymers is formed, having melt characteristics that differ from those of the individual fluoropolymers. The blended fluoropolymer composition may be used to provide a coating having improved abrasion resistance, gloss, and higher contact angles.

IV. Coating Properties

The present coating composition, when applied to a substrate, either directly to the substrate or over an underlying coating, exhibits a contact angle of at least 110°, and may have a contact angle of at least 120°, 125°, 130°, 135°, or 140°, for example, as measured for a water droplet according to the Young Relation. Contact angle may be measured according to ASTM D7334-08 with any suitable commercially available instrument, such as the "Drop Shape Analysis" system (DSA10), available from Kruss GmbH of Hamburg, Germany.

The present coating composition, when applied to a substrate, either directly to the substrate or over an underlying coating, exhibits a surface roughness (Ra, arithmetic mean deviation of the roughness profile, measured in nanometers (nm)) of less than 100 nm, and may have a surface roughness of less than 80 nm, 60 nm, or 50 nm, for example, as determined by laser profilometry, for example, according to ASME Y 14.36M-1996 or ISO 1302:2002.

The present coating composition, when applied to a substrate, either directly to the substrate or over an underlying coating, exhibits a measured gloss, in % reflectance, of at least 15, and may have a measured gloss of at least 25, 30, 35, 40, or 45, for example, as measured at 60° with any suitable commercially available instrument, such as a Microgloss 60° glossmeter, available from Byk-Gardner, in accordance with the following standards: BS3900/D5, DIN EN ISO 2813, DIN 67530, EN ISO 7668, ASTM D523, ASTM D1455, ASTM C346, ASTM C584, ASTM D2457, JIS Z 8741, MFT 30064, TAPPI T 480. Units of measurement are expressed as % reflectance.

Other, somewhat more subjective methods of characterizing the coatings formed by the present coating compositions are discussed in detail in the Examples below.

EXAMPLES 1-7

The following non-limiting Examples illustrate various features and characteristics of the present invention, which is not to be construed as limited thereto. Throughout the Examples and elsewhere herein, percentages are by weight unless otherwise indicated.

Example 1

Formulation of Topcoats and Application to Rigid Substrates

In this Example, topcoats made in accordance with the present invention were applied over conventional base coatings ("basecoats") to rigid substrates in the form of aluminum panels. Topcoats formulated in accordance with the present invention were evaluated against control topcoats.

A. Description of the Base Coat.

It is well known in the art that aqueous solutions of polyamic acid can be prepared by the dissolution of a polyamide-imide (PAI) powder in water, such as Torlon® AI-10, available from Solvay Advanced Polymers, LLC (Torlon® is a registered trademark of Solvay Advanced Polymers, LLC) in the presence of various components including amines, such as dimethylethanolamine (DMAE) and co-solvents, such as furfuryl alcohol and n-methyl pyrrolidone (NMP). A more detailed description of the preparation of aqueous PAI solutions can be found in U.S. Pat. No. 4,014,834, the disclosure of which is expressly incorporated by reference herein. The polyamic acid solution can then be formulated into a base coat by the addition of various compositions.

The topcoat formulations were coated onto one of the two basecoats (Basecoat A or Basecoat B) prepared as described above and formulated as set forth in Table 3 below.

TABLE 3

Basecoat Formulations

| Component | Basecoat A Weight % | Basecoat B Weight % |
| --- | --- | --- |
| Deionized Water | 57.47 | 57.81 |
| Carbon Black | 0.56 | 0.51 |
| PTFE Dispersion (60% solids) | 11.5 | 9.2 |
| FEP Dispersion (54.5% solids) | 6.8 | 5.2 |
| Foamblast 389 Defoamer | 0.07 | 0.05 |

TABLE 3-continued

Basecoat Formulations

| Component | Basecoat A Weight % | Basecoat B Weight % |
|---|---|---|
| Surfynol 440 | 1.09 | 0.79 |
| Octylphenolpolyethoxy nonionic surfactant | 0.15 | 0.11 |
| Torlon AI-10 powder | 6.7 | 5.8 |
| NMP | 4.76 | 3.83 |
| Furfuryl Alcohol | 1.83 | 1.54 |
| Dimethylaminoethanol (DMAE) | 1.83 | 1.53 |
| PES resin | 1.39 | none |
| Colloidal Silica (30% solids) | none | 7.3 |
| Alumina (0.35-0.5 microns) | 3.62 | 4.33 |
| Ultramarine Blue | 2.79 | 2 |

Test samples were prepared by spraying Basecoat A or Basecoat B onto pre-cleaned aluminum panels, followed by heating in an oven at 100° C. for two minutes. Topcoats 1-10 were applied over Basecoat A whereas Topcoats 11-17 were applied over Basecoat B.

B. Application of Topcoats.

Topcoats formulated as described below were applied to the test samples by spraying. The coated panels were then cured for 10 minutes in an oven at 430° C. As applied, the dry-film thickness (DFT) of the basecoat was approximately 8 μm, and that of the topcoats were approximately 25 μm.

Example topcoats were made using a combination of three fluoropolymer dispersions and a topcoat base. The fluoropolymer components of the topcoats included one or more of the following: one or more high molecular weight PTFE (HPTFE) dispersions, one or more melt processible fluoropolymer dispersions (MPF), exemplified herein as perfluoro alkoxy (PFA), and one or more low molecular weight PTFE (LPTFE) dispersions.

A first set of topcoats, designated Topcoats 2-10 below, were formulated using LPTFE produced by dispersion polymerization or emulsion polymerization and which is not thereafter not agglomerated, irradiated, or thermally degraded. A second set of topcoats, designated Topcoats 11-17 below, were formulated using LPTFE micropowders.

1. Topcoats Formulated with LPTFE Produced by Dispersion Polymerization or Emulsion Polymerization and which is Thereafter not Agglomerated, Irradiated, or Thermally Degraded.

In addition to the HPTFE component, the present topcoats include a blend of the MPF and LPTFE components. In some of the formulations described below, the ratio of MPF and LPTFE varies while the amount of HPTFE used is held constant. In other formulations described below, the ratio of MPF and LPTFE is held constant while the amount of HPTFE used varies.

The formula for the topcoat base, used in each topcoat formulation of the present Example, is set forth below in Table 4.

TABLE 4

Topcoat Base

| Component | Weight % |
|---|---|
| Foamblast 384E defoamer | 0.31 |
| Deionized water | 59 |
| Carbopol EP-1 thickener | 0.93 |

TABLE 4-continued

Topcoat Base

| Component | Weight % |
|---|---|
| Acrylic resin | 10.96 |
| Carbon black | 2.61 |
| Octylphenolpolyethoxy nonionic surfactant | 2.73 |
| Polyethylene glycol | 2.64 |
| Triethanolamine | 6.99 |
| Oleic acid | 2.02 |
| 12% Cerium ethylhexanoate | 1.8 |
| Surfynol 440 surfactant | 1.71 |
| Aromatic 100 | 4.6 |
| DGBE glycol ether | 3.7 |

Various fluoropolymer blend ratios were investigated by combining the topcoat base with varying ratios of the HPTFE, LPTFE and MPF (PFA) components. Expressed as weight percents, the fluoropolymer components totaled 67.8 weight percent of the example formula, while the topcoat base comprised the remaining 32.2 weight percent of each topcoat formulation, per Table 5 below.

TABLE 5

Example Topcoat formula

| Component | Weight % |
|---|---|
| HPTFE dispersion | Combined fluoropolymer weight % = 67.8 |
| LPTFE dispersion | |
| MPF (PFA) dispersion | |
| Topcoat Base | 32.2 |

In the topcoat formulations, the HPTFE component was Daikin's D-310 PTFE dispersion (60% solids), the LPTFE component was SFN-D PTFE dispersion (50% solids), and the MPF component was either of Type 1 (Dyneon 6900GZ PFA dispersion (50% solids)) or Type 2 (DuPont TE7224 PFA dispersion (60% solids)).

Tables 6 and 7 below contain formulation and performance data about the various example topcoats that will be referenced in the further Examples described below. Test procedures for the performance data are set forth in the Test Methods section below.

TABLE 6

Example Topcoats 1-5

| | Example Topcoat | | | | |
|---|---|---|---|---|---|
| | 1 (Control) | 2 | 3 | 4 | 5 |
| HPTFE, wet weight % | 63.7 | 61.3 | 63.6 | 46.2 | 32.3 |
| LPTFE, wet weight % | 0 | 2.4 | 4.2 | 11.2 | 18.3 |
| MFP, wet weight % | 4.1 | 4.1 | 0 | 10.4 | 17.2 |
| MFP type | 1 | 1 | | 2 | 2 |
| Topcoat Base (Table 2), weight % | 32.2 | 32.2 | 32.2 | 32.2 | 32.2 |
| Dry Egg release test rating, (1-5, with 5 best) | 4 | 5 | 5 | 4.5 | 3 |
| Reciprocating Abrasion Test, Wet RAT cycles/μm DFT | 98 | 161 | 233 | 101 | 65 |
| Mechanical Scratch Adhesion Test, Rating = 1-9, with 9 best | 6 | 8 | 5 | 5 | 6 |
| 60° Gloss | 42 | 40 | 46 | 30 | 22 |
| Contact Angle, ° | 129 | 131 | 112 | 130 | 131 |

TABLE 7

Example Topcoats 6-10

| | Example Topcoat | | | | |
|---|---|---|---|---|---|
| | 6 | 7 | 8 | 9 | 10 |
| HPTFE, wet weight % | 19.1 | 35.2 | 32 | 60.4 | 52.1 |
| LPTFE, wet weight % | 25 | 16.3 | 23 | 3.8 | 6.3 |
| MFP, wet weight % | 23.7 | 16.3 | 12.8 | 3.6 | 9.4 |
| MFP type | 2 | 2 | 2 | 2 | 1 |
| Topcoat Base (Table 2), weight % | 32.2 | 32.2 | 32.2 | 32.2 | 32.2 |
| Dry Egg release test rating, (1-5, with 5 best) | 1.2 | 1.2 | 2.5 | 5 | 5 |
| Reciprocating Abrasion Test, Wet RAT cycles/μm DFT | 134 | 60 | 58 | 126 | 113 |
| Mechanical Scratch Adhesion Test, Rating = 1-9, with 9 best | 4 | 4.5 | 4 | 8 | 6 |
| 60° Gloss | 19 | 36 | 19 | 44 | 48 |
| Contact Angle, ° | 122 | 117 | 142 | 131 | 126 |

2. Topcoats Formulated with LPTFE Micropowders.

LPTFE micropowder dispersions were formulated per Table 8 below:

TABLE 8

LPTFE Micropowder dispersion

| Component | Weight % |
|---|---|
| Deionized Water | 47.7 |
| Surfynol 440 | 1.5 |
| Triton X-100 | 0.6 |
| Foamblast 384E | 0.2 |
| LPTFE Micropowder | 50.0 |

50% waterborne dispersions were made using a disperser to initially wet the micropowders. After wetting, the dispersions were moved to a Silverson mixer and dispersions were continued using the #2 screen (screens are numbered 1-4, with 4 largest mesh size). These premixes were dispersed with the Silverson mixer at 50% speed for 30 minutes.

Topcoats were then formulated per Table 9 below using the same topcoat base described above and were applied to test samples using the same procedure described above.

TABLE 9

LPTFE Micropowder Topcoat

| Component | Weight % |
|---|---|
| Daikin D310 PTFE Dispersion (HPTFE) | 60.0 |
| PFA Dispersion (MPF) in Table 12 below | 4.1 |
| PTFE Micropowder Dispersion (LPTFE) | 3.6 |
| Topcoat Base | 32.3 |

The micropowders evaluated are set forth in Table 10 below.

TABLE 10

LPTFE micropowders evaluated

| Micropowder Used | Solids content (weight %) | Mean particle size, μm | First melt temperature (DSC), ° C. |
|---|---|---|---|
| Laurel MP-8T | 100.0 | 1.32 | 323.1 |
| Laurel MP-55 | 100.0 | 0.84 | 324.3 |
| Laurel MP-25 | 100.0 | 0.28 | 332 |
| Laurel UF-8TA | 100.0 | 1.22 | 331.5 |
| Dyneon 9207 | 100.0 | 13.27 | 327.6 |
| Laurel MP-10 | 100.0 | 11.06 | 330 |

Table 11 below contains formulation and performance data about the various example topcoats that were formulated with the indicated LPTFE micropowders.

TABLE 11

Example Topcoats 11-15

| Example Topcoat | 11 (control) | 12 | 13 | 14 | 15 | 16 | 17 |
|---|---|---|---|---|---|---|---|
| HPTFE, % FP component weight solids | 94 | 90 | 90 | 90 | 90 | 90 | 90 |
| MPF, % FP component weight solids | 6 | 5 | 5 | 5 | 5 | 5 | 5 |
| LPTFE Micropowder, % FP component weight solids | 0 | 5 | 5 | 5 | 5 | 5 | 5 |
| Micropowder and type of polymerization (S-suspension, D-dispersion) | None | MP-8T (S) | MP-55 (D) | MP-25 (D) | UF-8TA (D) | 9207 (D) | MP-10 (S) |
| Dry Egg Release Test, Rating = 1-5, with 5 best | 4.0 | 1.4 | 3.4 | 4.4 | 5 | 4.8 | 4.8 |

TABLE 11-continued

Example Topcoats 11-15

| Example Topcoat | 11 (control) | 12 | 13 | 14 | 15 | 16 | 17 |
|---|---|---|---|---|---|---|---|
| Mechanical Scratch Adhesion Test, Rating = 1-9, with 9 best | 6 | 6 | 6 | 6 | 6 | 6 | 6 |
| 60° Gloss | 32 | 32 | 32 | 38 | 33 | 33 | 27 |
| Contact Angle, ° | 129 | 132 | 126 | 129 | 130 | 129 | 126 |

It will be seen from the above data that the mechanical scratch test results for Topcoats 11-17, which were formulated with LPTFE micropowders, tends to be less than the best results observed for Topcoats 2-10, which were formulated with LPTFE produced by dispersion polymerization or emulsion polymerization and which is thereafter not agglomerated, irradiated, or thermally degraded. However, Topcoats 15, 16, and 17, formulated with the LPTFE micropowders UF-8TA, 9207, and MP-10, respectively, which have relatively higher molecular weights and first melt temperatures ($T_m$) among the LPTFE micropowders tested, still demonstrated acceptable performance in the tests of Table 11, which are particularly pertinent to cookware applications. This indicates that LPTFE micropowders having first melt temperatures ($T_m$) between 327° C. and 332° C. are perhaps more ideally suited in these applications.

Also, Topcoats 12 and 13, formulated with the LPTFE micropowders MP-8T and MP-55, respectively, have relatively lower molecular weights and first melt temperatures ($T_m$) of the LPTFE micropowders tested. Formulations based on such low molecular weight materials have a tendency to soften under stove-top cooking conditions which results in the observed poor release behavior. However, such formulations would still be expected to have utility at lower service temperatures.

Table 12 below is a summary of the relative weight percents of the fluoropolymer components of Topcoats 1-17.

EXAMPLES 2-7

In Examples 2-7 below, the performance data of Topcoats 1-10 is discussed in further detail.

Example 2

Comparison Between Control Topcoat Lacking LPTFE/MPF Blend and Topcoat Including LPTFE/MPF Blend A comparison between the performance characteristics of a control topcoat (Topcoat 1) lacking LPTFE and a topcoat (Topcoat 2) including LPTFE is set forth below in Table 13.

TABLE 13

| Test Method | Dry Egg Release Test (Rating 1-5, with 5 best) | Mechanical Scratch Adhesion Test (Rating 1-9, with 9 best) | Reciprocating Abrasion Test (Wet RAT cycles/ μm DFT) | 60° Gloss | Contact Angle, ° |
|---|---|---|---|---|---|
| Topcoat 1 (control) | 4 | 6 | 98 | 42 | 129 |
| Topcoat 2 | 5 | 8 | 161 | 40 | 131 |

TABLE 12

Fluoropolymer formulation summary for Topcoats 1-17

| Top-coat | HPTFE wt. % of total FP solids | LPTFE wt. % of total FP solids | MPF wt. % of total FP solids | LPTFE wt. % of LPTFE and MPF | MPF wt. % of LPTFE and MPF | LPTFE TYPE | MPF TYPE |
|---|---|---|---|---|---|---|---|
| 1 (control) | 94.0 | 0.0 | 6.0 | 0.0 | 100.0 | NONE | TE7224 |
| 2 | 91.9 | 3.0 | 5.1 | 36.9 | 63.1 | SFN-D | 6900GZ PFA |
| 3 | 94.8 | 5.2 | 0.0 | 100.0 | 0.0 | SFN-D | NONE |
| 4 | 70.1 | 14.2 | 15.8 | 47.3 | 52.7 | SFN-D | TE7224 |
| 5 | 49.9 | 23.6 | 26.6 | 47.0 | 53.0 | SFN-D | TE7224 |
| 6 | 30.0 | 32.7 | 37.2 | 46.8 | 53.2 | SFN-D | TE7224 |
| 7 | 54.1 | 20.9 | 25.0 | 45.5 | 54.5 | SFN-D | TE7224 |
| 8 | 50.0 | 30.0 | 20.0 | 60.0 | 40.0 | SFN-D | TE7224 |
| 9 | 89.9 | 4.7 | 5.4 | 46.8 | 53.2 | SFN-D | TE7224 |
| 10 | 78.1 | 7.9 | 14.1 | 35.8 | 64.2 | SFN-D | TE7224 |
| 11 (control) | 94.0 | 0.0 | 6.0 | 0.0 | 100.0 | NONE | TE7224 |
| 12 | 90.0 | 5.0 | 5.0 | 50.0 | 50.0 | MP-8T | TE7224 |
| 13 | 90.0 | 5.0 | 5.0 | 50.0 | 50.0 | MP-55 | TE7224 |
| 14 | 90.0 | 5.0 | 5.0 | 50.0 | 50.0 | MP-25 | TE7224 |
| 15 | 90.0 | 5.0 | 5.0 | 50.0 | 50.0 | UF-8TA | TE7224 |
| 16 | 90.0 | 5.0 | 5.0 | 50.0 | 50.0 | TF-9207 | 6900GZ PFA |
| 17 | 90.0 | 5.0 | 5.0 | 50.0 | 50.0 | MP-10 | TE7224 |

From an examination of the data in Table 13, it is readily apparent that addition of a small amount of an LPTFE/MPF fluoropolymer blend according to the present invention to the coating formulation results in dramatic improvements to the abrasion and release properties of the coating. The RAT and mechanical scratch tests are traditional tests used to measure the abrasion resistance and durability of a given system. In both cases, the Topcoat 2 showed a significant improvement in abrasion resistance and toughness versus the control.

The ease of cleaning or removing cooked food from a non-stick surface is termed "release". Both the burnt milk test (as shown in Table 19 below) and the dry-egg release tests are recognized by the cookware industry as valid measures of release. A dramatic improvement in release as measured by the burnt-milk test was seen for the Topcoat 2 versus the control. A similar, but less dramatic improvement in release as measured by the dry-egg release test was seen for Topcoat 2.

Example 3

Investigation of Varying the Amount of LPTFE in the LPTFE/MPF Blend

The effect of LPTFE addition to HPTFE-based topcoats was studied. Topcoat 3 was made by a weight percentage substitution of LPTFE for the MPF component in Topcoat 1. Topcoat 3 was compared to the Topcoat 1 by evaluating abrasion resistance, mechanical scratch adhesion, and dry egg release properties. Test panels and pans were prepared by spraying Basecoat A onto a pre-cleaned aluminum panel substrate, followed by heating in an oven at 100° C. for two minutes.

Topcoats 1 and 3 were then applied to respective test samples by spraying the primed and cooled substrates with the topcoat to be evaluated, the components of which are described in Table 6 above. The coated substrates were cured for 10 minutes in an oven at 430° C. As applied, the dry-film thickness (DFT) of the basecoat was approximately 8 µm, and that of the topcoats were approximately 25 µm. A comparison between the performance characteristics is set forth below in Table 14.

TABLE 14

| Test Method | Dry Egg Release Test (Rating 1-5, with 5 best) | Mechanical Scratch Adhesion Test (Rating 1-9, with 9 best) | Reciprocating Abrasion Test (Wet RAT cycles/µm DFT) | 60° Gloss | Contact Angle, ° |
|---|---|---|---|---|---|
| Topcoat 1 (control) | 4 | 6 | 98 | 42 | 129 |
| Topcoat 3 | 5 | 5 | 233 | 46 | 112 |

From an examination of Table 14, it is readily apparent that the substitution of LPTFE for the MPF component in the Topcoat 1, as exemplified by Topcoat 3, results in a topcoat formulation that exhibits improvements in release and abrasion properties, but also exhibits a drop in durability as reflected in the mechanical scratch adhesion test.

While abrasion resistance and release are important coating characteristics, the mechanical scratch adhesion test most closely simulates consumer use and abuse of cookware.

Example 4

Optimization of the Fluoropolymer Blend and HPTFE Levels

Variations in the topcoat fluoropolymer blend ratios to the HPTFE component level were evaluated for abrasion resistance, mechanical scratch adhesion, and release. Test panels and pans were prepared by spraying Basecoat A onto a pre-cleaned substrate, followed by heating in an oven at 100° C. for two minutes.

Topcoats were then applied by spraying the primed and cooled substrates with the topcoat to be evaluated, the formulations of which are described in Tables 6 and 7 above. The coated substrates were cured for 10 minutes in an oven at 430° C. As applied, the dry-film thickness (DFT) of the basecoat was approximately 8 µm, and that of the topcoats were approximately 25 µm. A comparison between the performance characteristics is set forth below in Table 15.

TABLE 15

| Test Method | Dry Egg Release Test (Rating 1-5, with 5 best) | Mechanical Scratch Adhesion Test (Rating 1-9, with 9 best) | Reciprocating Abrasion Test (Wet RAT cycles/µm DFT) | 60° Gloss | Contact Angle, ° |
|---|---|---|---|---|---|
| Topcoat 1 (control) | 4 | 6 | 98 | 42 | 129 |
| Topcoat 7 | 1.2 | 4.5 | 60 | 36 | 117 |
| Topcoat 8 | 2.5 | 4 | 58 | 19 | 142 |
| Topcoat 4 | 4.5 | 5 | 101 | 30 | 130 |
| Topcoat 10 | 5 | 6 | 113 | 48 | 126 |
| Topcoat 9 | 5 | 8 | 126 | 44 | 131 |

Examination of Table 15 shows that Topcoat 9 containing approximately 5% LPTFE and 5% PFA by weight of total fluoropolymer yielded the best overall combination of properties. In general where HPTFE>70% by weight of fluoropolymers in coatings containing both LPTFE and MPF some enhancement in properties was observed versus the control. Table 11 also indicates that an approximate 1:1 ratio of MPF:LPTFE is preferred. The level of HPTFE for optimum properties is given below in Example 5.

Example 5

Evaluation of a Fixed Fluoropolymer Blend (1:1 Ratio of LPTFE to MPF) to Variable HPTFE Levels Variations in the amount of the HPTFE component used in the topcoat formulations were investigated, with the LPTFE and MPF components present at constant a ratio of about 1:1, for abrasion resistance, mechanical scratch adhesion, and release. Test panels and pans were prepared by spraying Basecoat A onto a pre-cleaned substrate, followed by heating in an oven at 100° C. for two minutes.

Topcoats were then applied by spraying the primed and cooled substrates with the topcoat to be evaluated, the formulations of which are described in Tables 6 and 7 above. The coated substrates were cured for 10 minutes in an oven at 430° C. As applied, the dry-film thickness (DFT) of the basecoat was approximately 8 µm, and that of the topcoats were approximately 25 µm. A comparison between the performance characteristics is set forth below in Table 16.

TABLE 16

| Test Method | Dry Egg Release Test (Rating 1-5, with 5 best) | Mechanical Scratch Adhesion Test (Rating 1-9, with 9 best) | Reciprocating Abrasion Test (Wet RAT cycles/ μm DFT) | 60° Gloss | Contact Angle, ° |
|---|---|---|---|---|---|
| Topcoat 6 | 1.2 | 4 | 134 | 19 | 122 |
| Topcoat 5 | 3 | 6 | 65 | 22 | 131 |
| Topcoat 4 | 4.5 | 5 | 101 | 30 | 130 |
| Topcoat 10 | 5 | 6 | 113 | 48 | 126 |
| Topcoat 9 | 5 | 8 | 126 | 44 | 131 |

Table 16 reports test results that indicate that when the fluoropolymer blend is in the preferred 1:1 ratio that the preferred level of HPTFE is >than 80% of the total topcoat fluoropolymer content.

Example 6

Investigation of Smoothness of Fluoropolymer Blend Modified Topcoats

Fluoropolymer blend-modified topcoats formulated in accordance with the present invention have been found to exhibit gloss similar to, or higher than similarly formulated conventional topcoats formulated without the LPTFE component. The topcoats formulated in accordance with the present invention also exhibit a smoother tactile feel compared to conventional unmodified topcoats.

Topcoats formulated in accordance with the present invention exhibit improved smoothness compared to unmodified topcoats when the tested areas of the topcoats are visually observed after accelerated mechanical scratch tests were performed on a substrate to which the topcoats were applied. However, because these observations were subjective, laser profilometer comparisons of control topcoats and topcoats formulated in accordance with the present invention surfaces were undertaken in the present Example using a Wyko 1100 Optical Profilometer made by Veeco.

Figure 2:
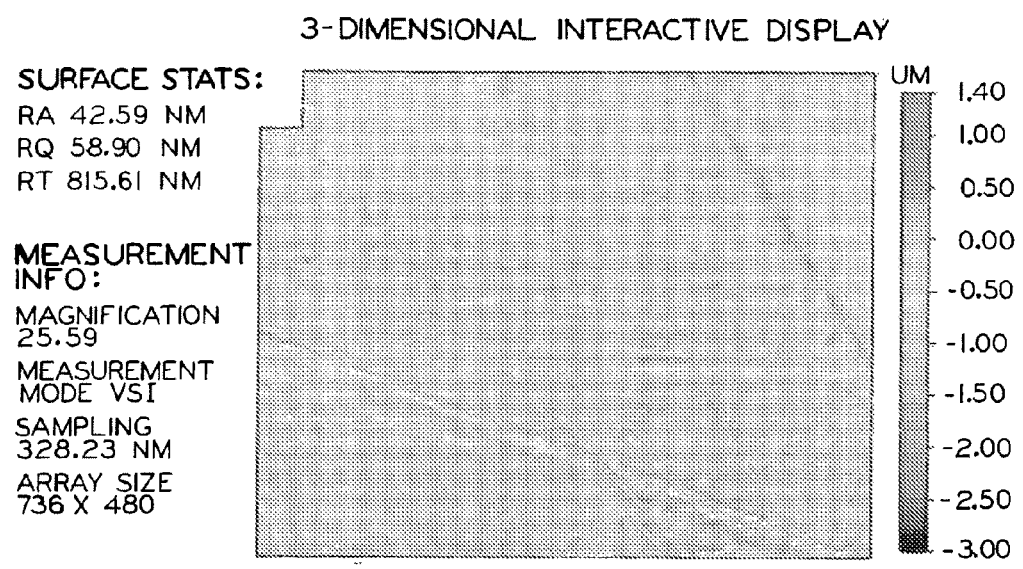
Figure 3:
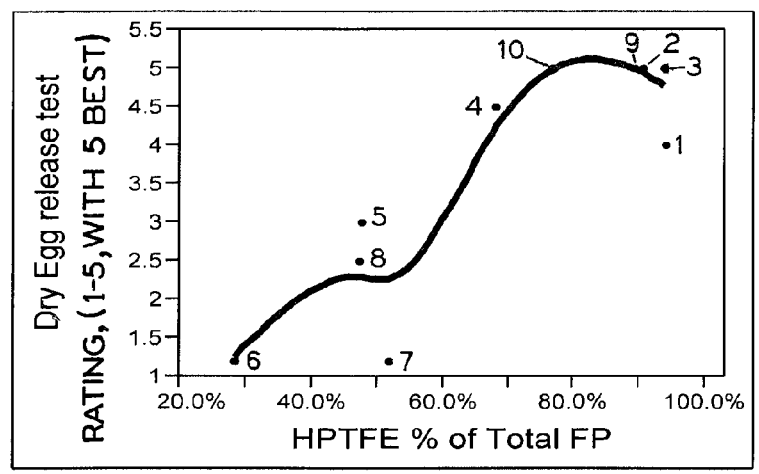
Figure 4:
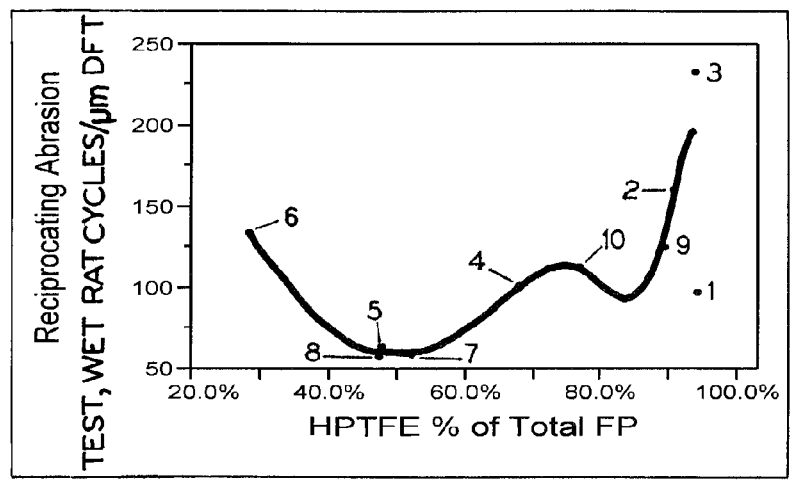
Figure 5:
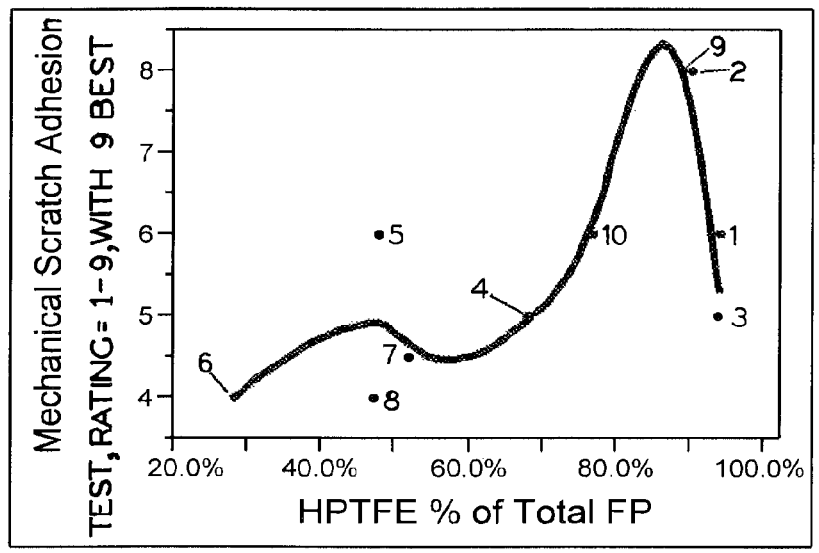
Figure 6:
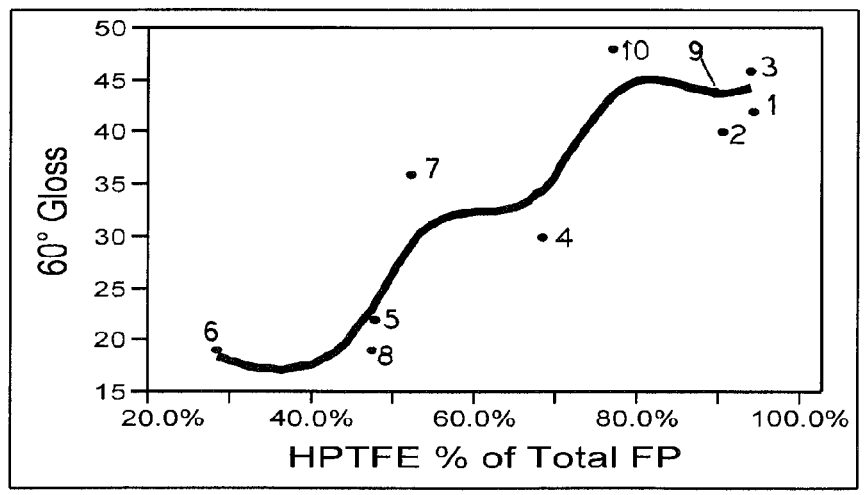
Figure 7:
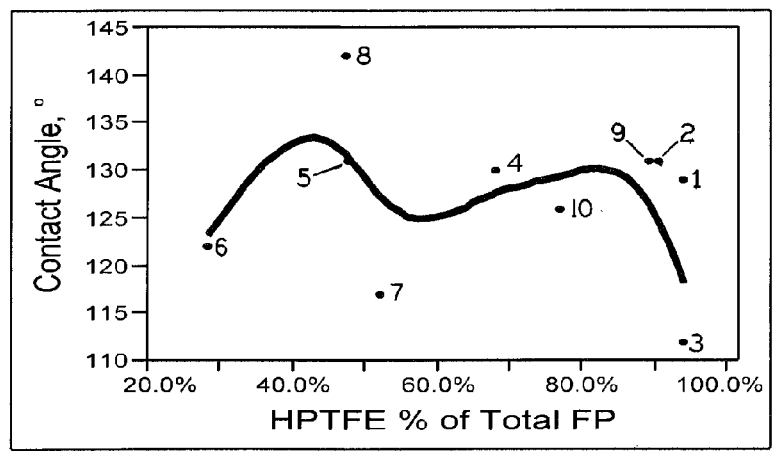
Figure 8:
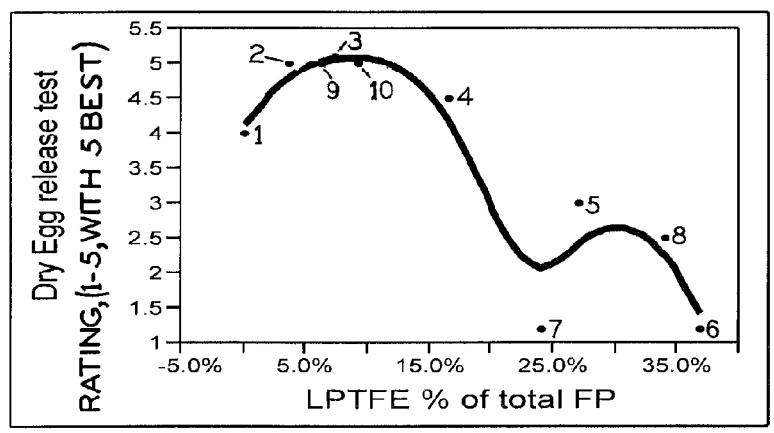
Figure 9:
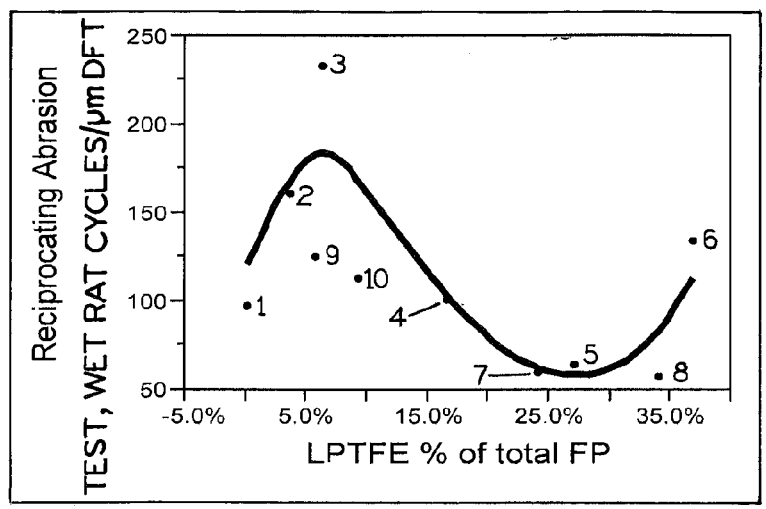
Figure 10:
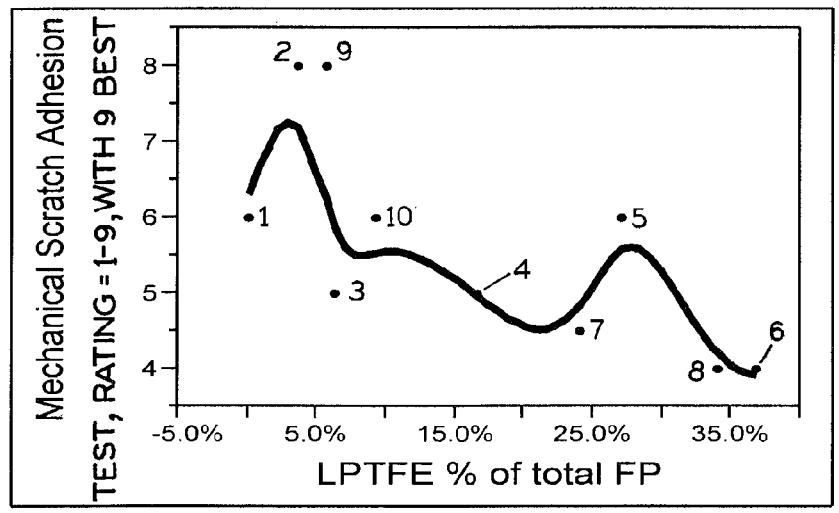
Figure 11:
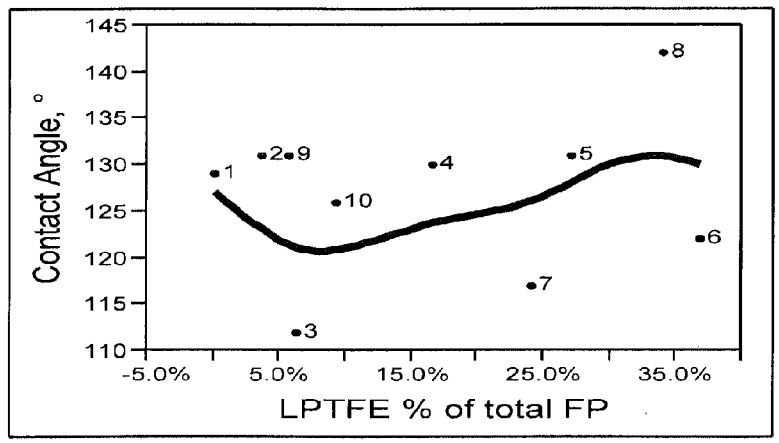
Figure 12:
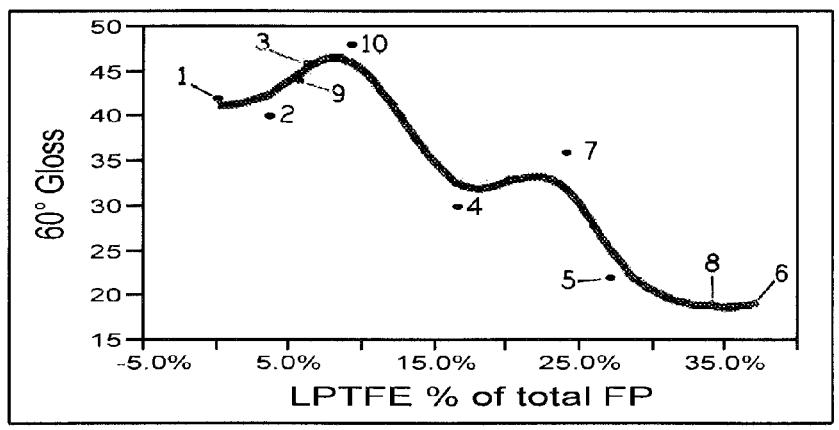
Figure 13:
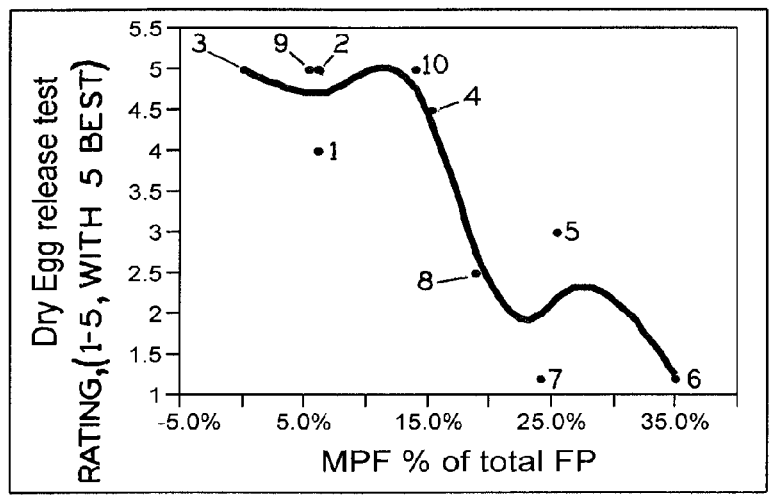
Figure 14:
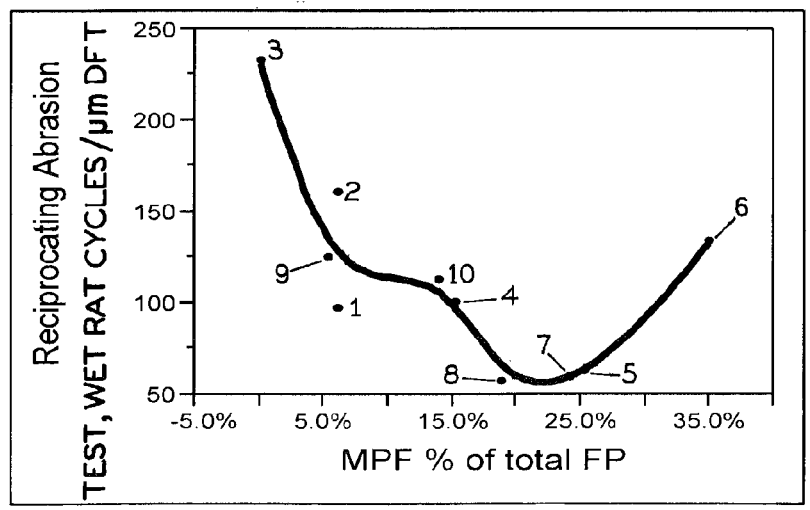
Figure 15:
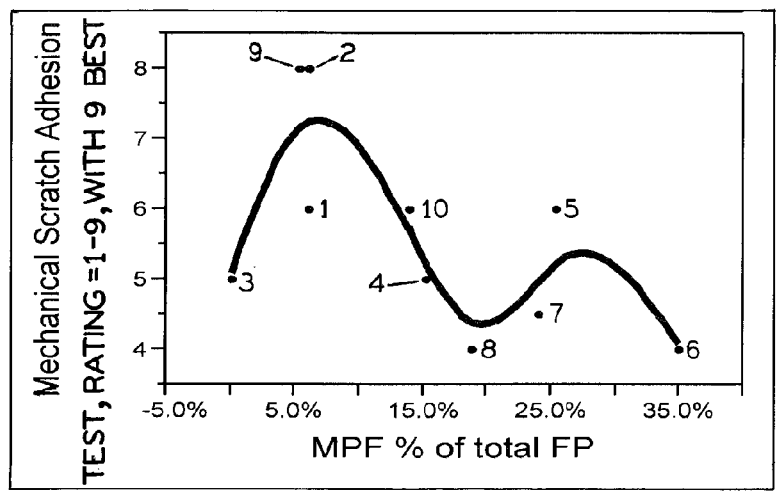
Figure 16:
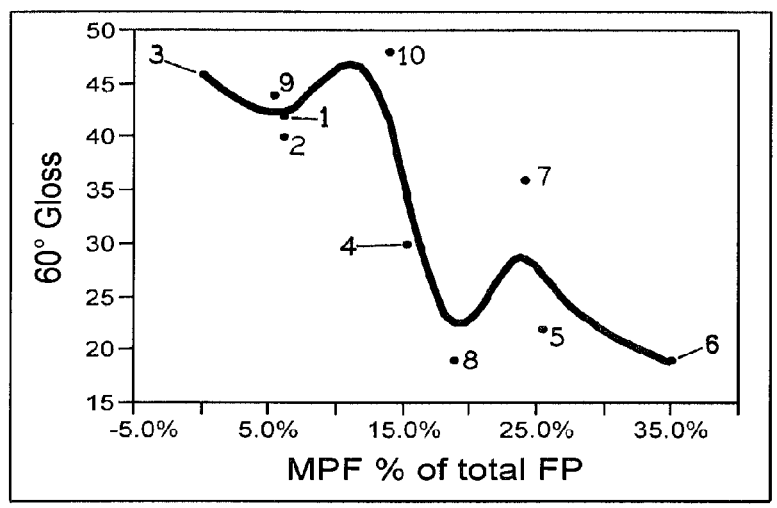
Figure 17:
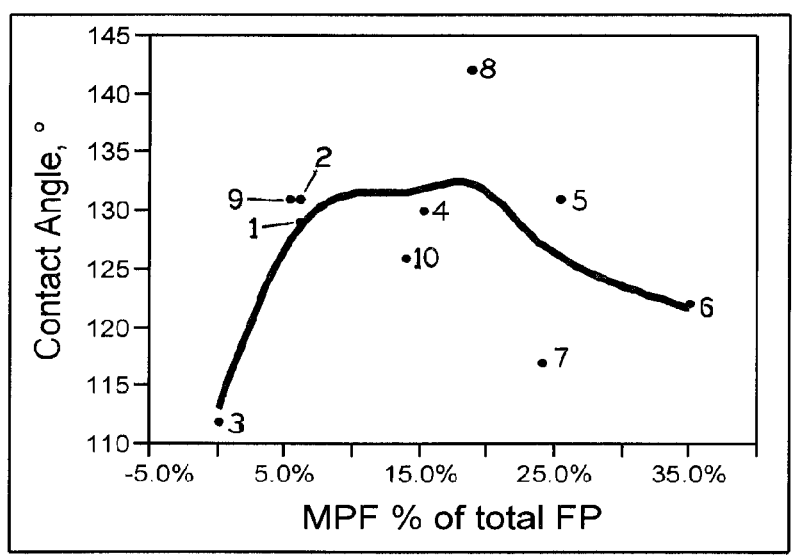
Figure 18:
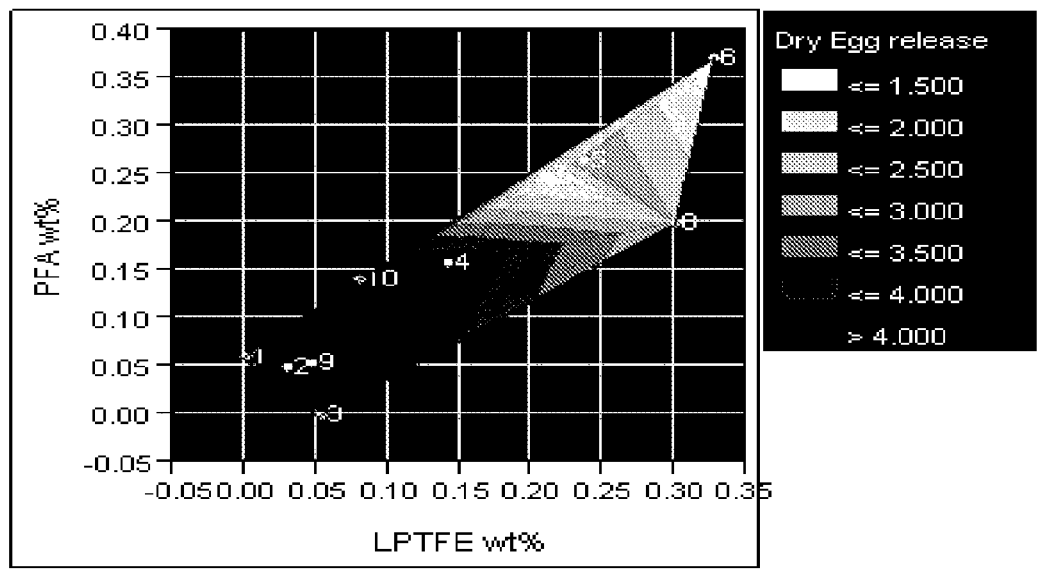
Figure 19:
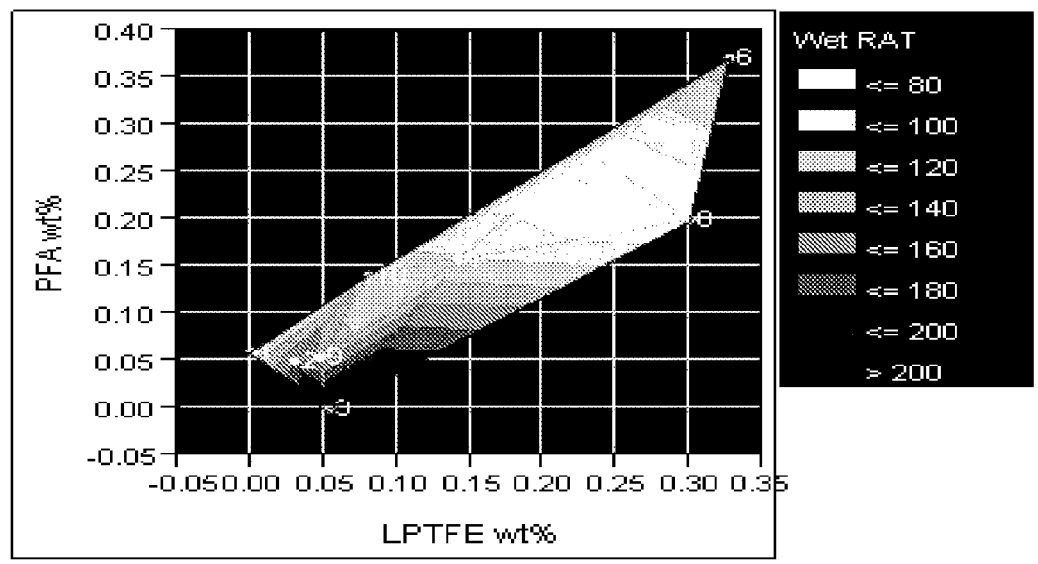
Figure 20:
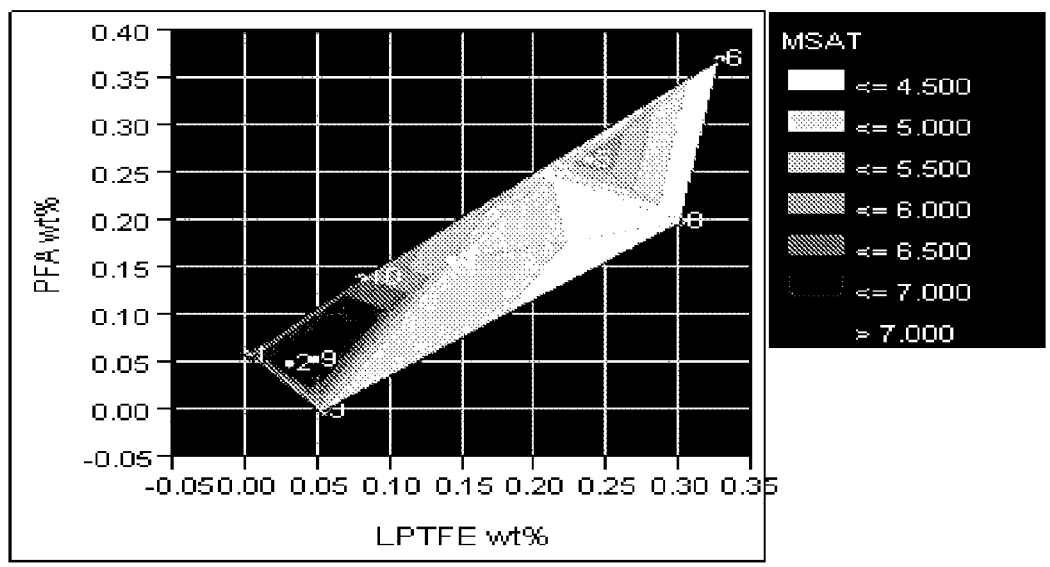
Figure 21:
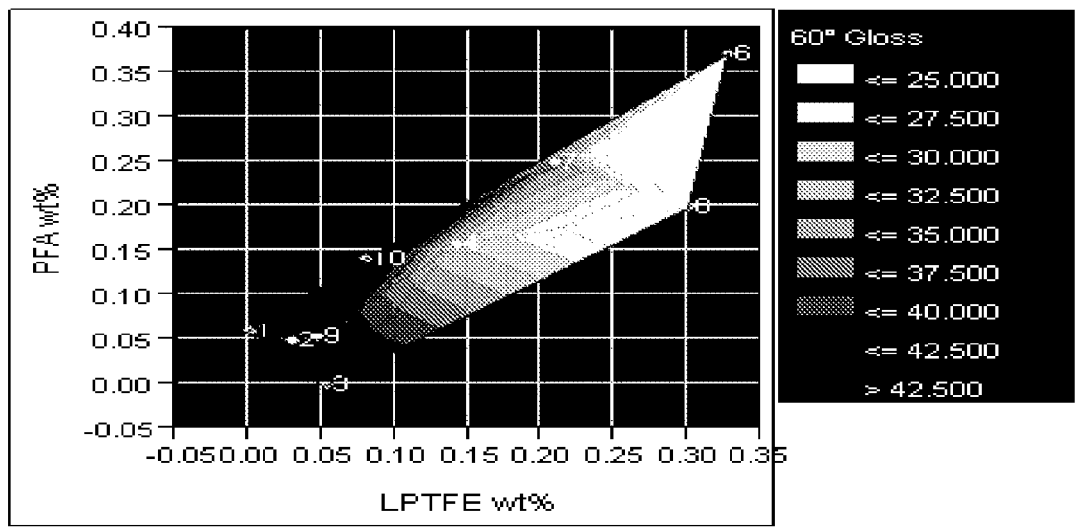
Figure 22:
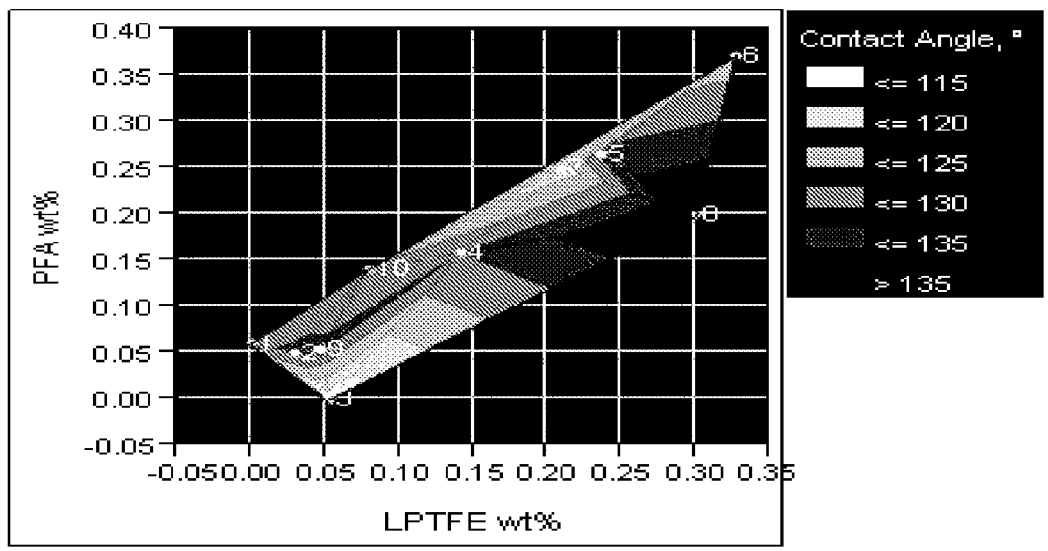

FIG. 1 is a laser profilometer image of the control topcoat, Topcoat 1, and FIG. 2 is a laser profilometer image of a topcoat formulated in accordance with the present invention, Topcoat 2.

The following three surface roughness measurements are set forth in FIGS. 1 and 2, and also in Table 17 below.

Ra=arithmetic mean deviation of the roughness profile, measured in nanometers (nm).

Rq=root-mean-square deviation of the roughness profile, measured in nanometers (nm).

Rt=the sum of the maximum profile peak height and the maximum profile valley depth in the evaluation area, measured in microns (μm).

TABLE 17

| Topcoat | Ra, nm | Rq, nm | Rt, μm |
|---|---|---|---|
| Topcoat 1 | 157.36 | 204.05 | 4.54 |
| Topcoat 2 | 42.59 | 58.9 | 0.82 |

From an examination of Table 17, it is readily apparent that the Topcoat 2 is much smoother than the control Topcoat 1.

Example 7

Study of Effects of Relative Contents of Fluoropolymer Components on Coating Properties The data presented in Examples 1-6 in connection with Topcoats 1-10 is summarized in FIGS. 3-17 in the form of charts in which the relative contents of the various fluoropolymer components of the present coating compositions are plotted versus the measured properties of the coatings.

In particular, FIGS. 3-7 show measured properties for the topcoats plotted as a function of the wt. % of the HPTFE component, FIGS. 8-12 show measured properties for the topcoats plotted as a function of the wt. % of the LPTFE component, and FIGS. 13-17 show measured properties for the topcoats plotted as a function of the wt. % of the MPF component. FIGS. 3-17 generally show that an overall combination of desired properties may be obtained when the fluoropolymer component of the blend contains between 2-20 wt. % LPTFE and 2-20 wt. % MPF.

Example 8

Contour Plots of Fluoropolymer Components on Coating Properties

FIGS. 18-23 show contour plots in connection with Topcoats 1-10 for Egg Release, RAT tests, Mechanical Scratch Test, Gloss, Contact Angle and "All Data Normalized" respectively as a function of the dry solids weight percents of the MPF (PFA) and LPTFE components of the topcoats. The last term, "All Data Normalized" is obtained from the following equation:

Mean{[Dry Egg release−Minimum(Dry Egg release)]/
[Maximum(Dry Egg release)−Minimum(Dry Egg release)],

[Wet RAT cycles/μm DFT−Minimum(Wet RAT)]/
[Maximum(Wet RAT−)−Minimum(Wet RAT)],

[MSAT−Minimum(MSAT)]/[Maximum(MSAT)−Minimum(MSAT)],

[60° Gloss−Minimum(60° Gloss)]/[Maximum(60° Gloss)−Minimum(60° Gloss)],

[Contact Angle−Minimum(Contact Angle)]/[Maximum(Contact Angle)−Minimum(Contact Angle)]}   Equation 1: All Normalized Data Calculation (MSAT is the mechanical scratch adhesion test)

That is, for each test the [actual values−minimum value of all data of that test] measured for all samples are divided by the range of values for that test, which normalizes the data on a 0-1 range. Then, to combine all tests to a single value the mean of all the normalized values is taken.

Examination of FIGS. 18-23 reveals that Gloss, RAT and Mechanical Scratch performance correspond with good dry egg release, whereas there is a somewhat less pronounced correlation between contact angle and egg release.

Figure 23:
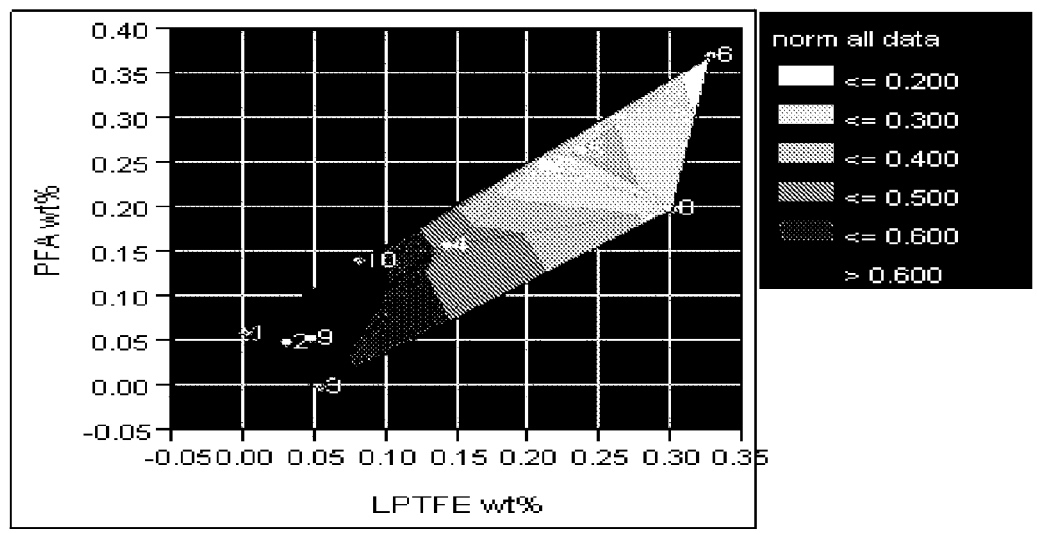
Figure 24:
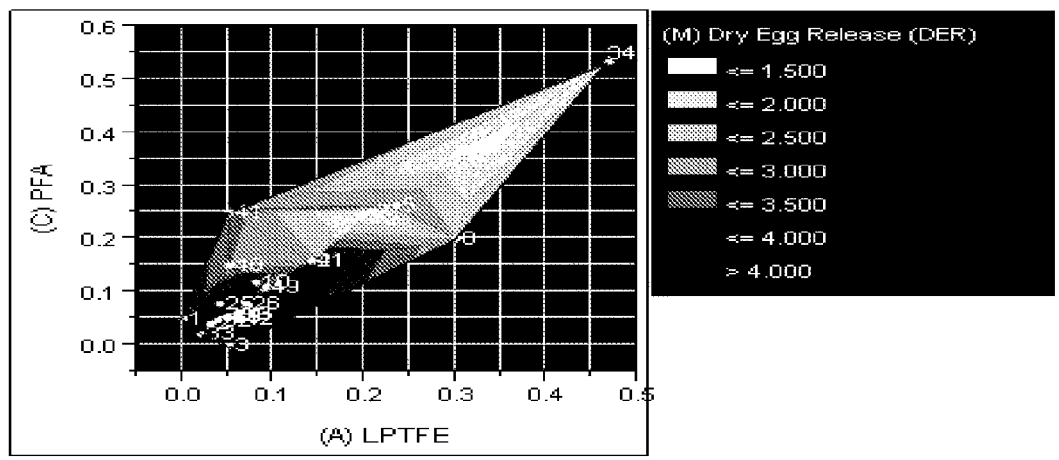
Figure 25:
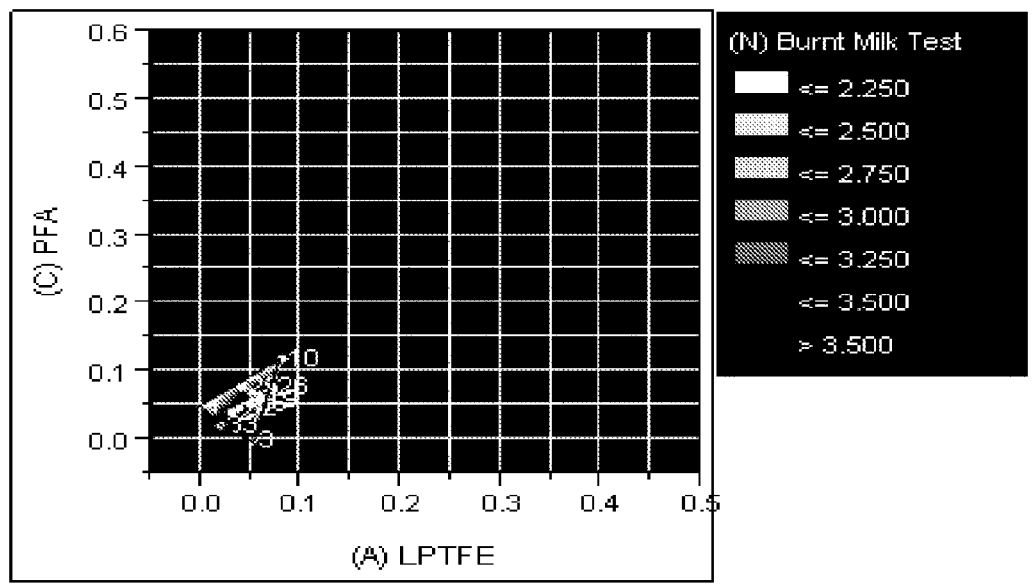
Figure 26:
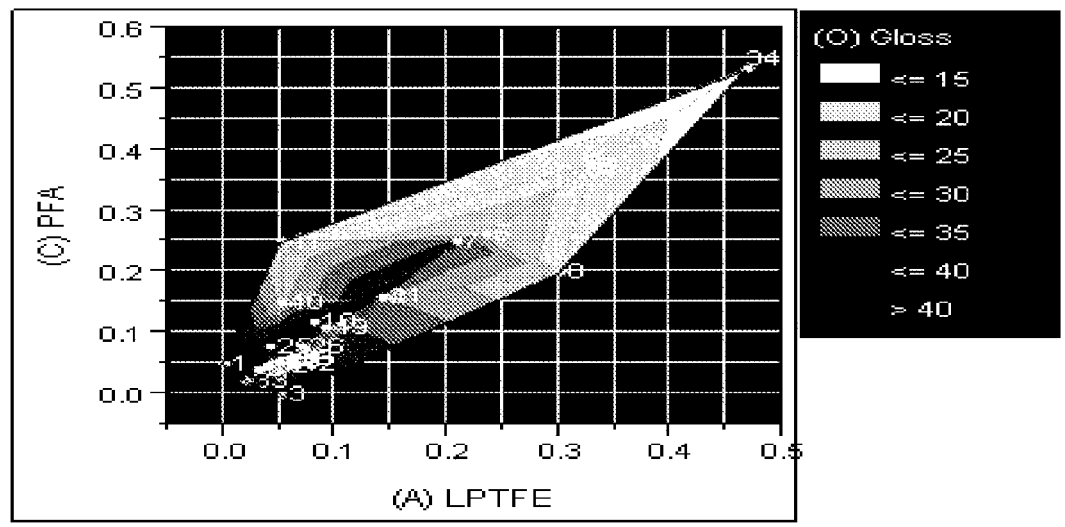
Figure 27:
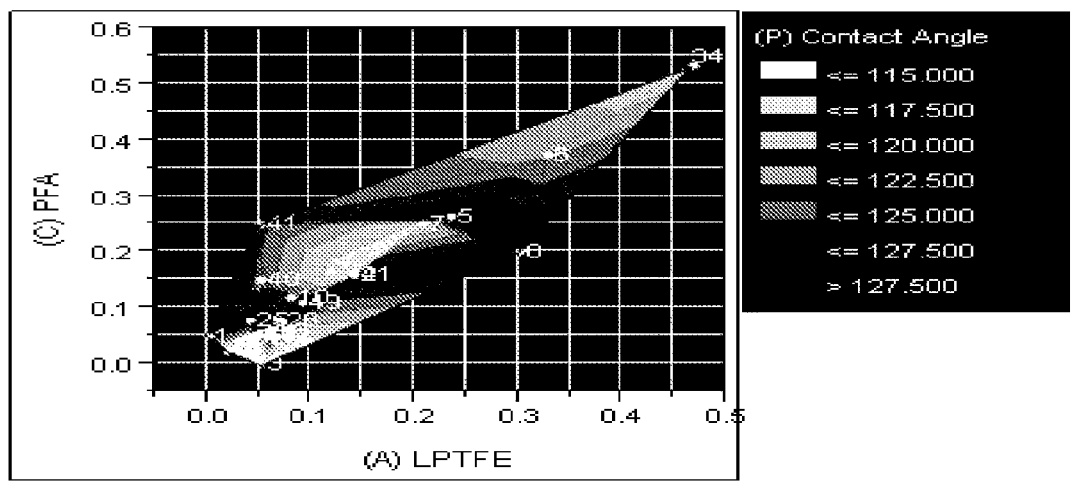
Figure 28:
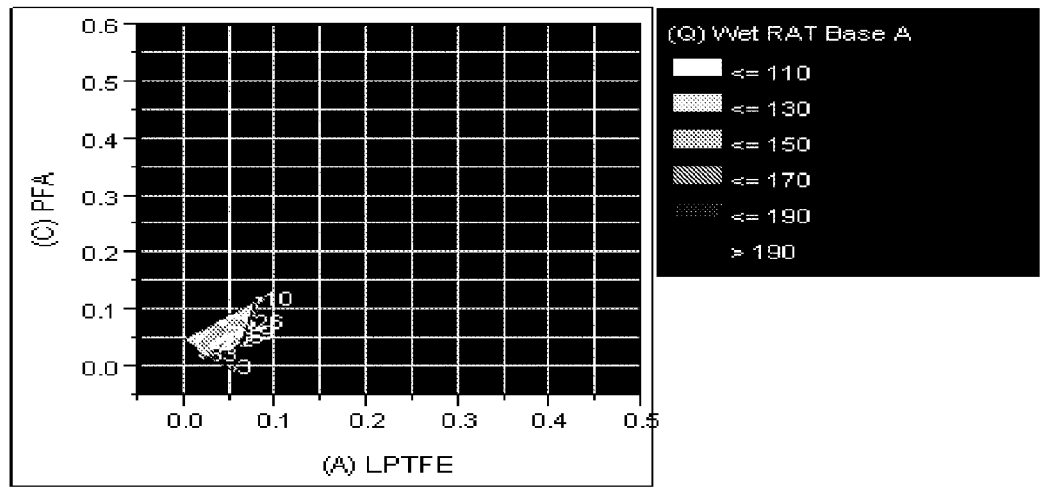
Figure 29:
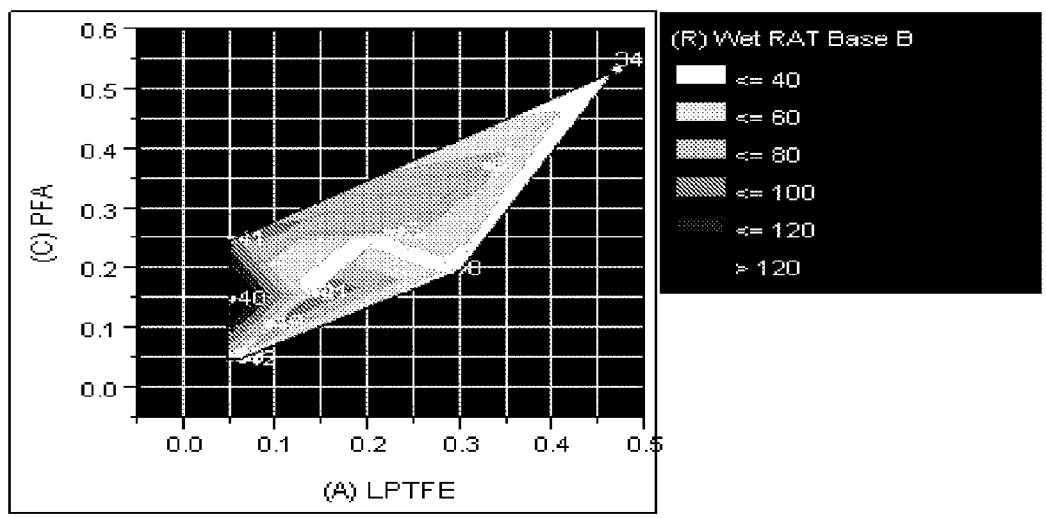
Figures 30, 31:
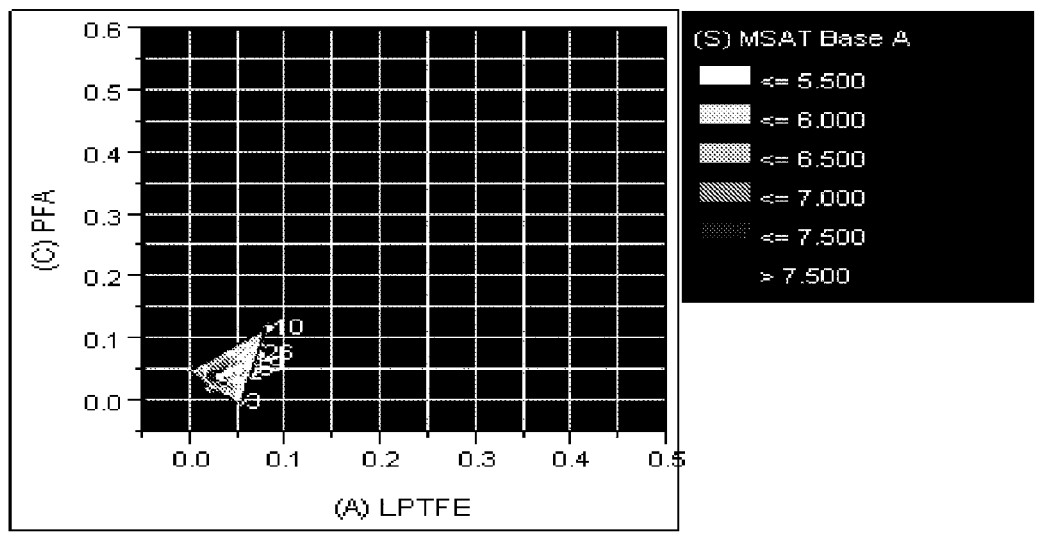
Figure 32:
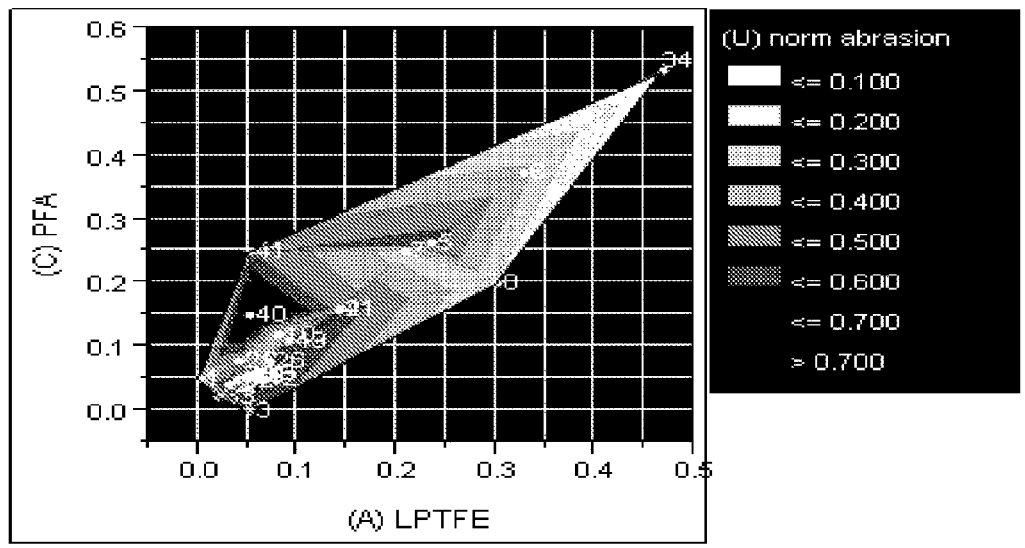
Figure 33:
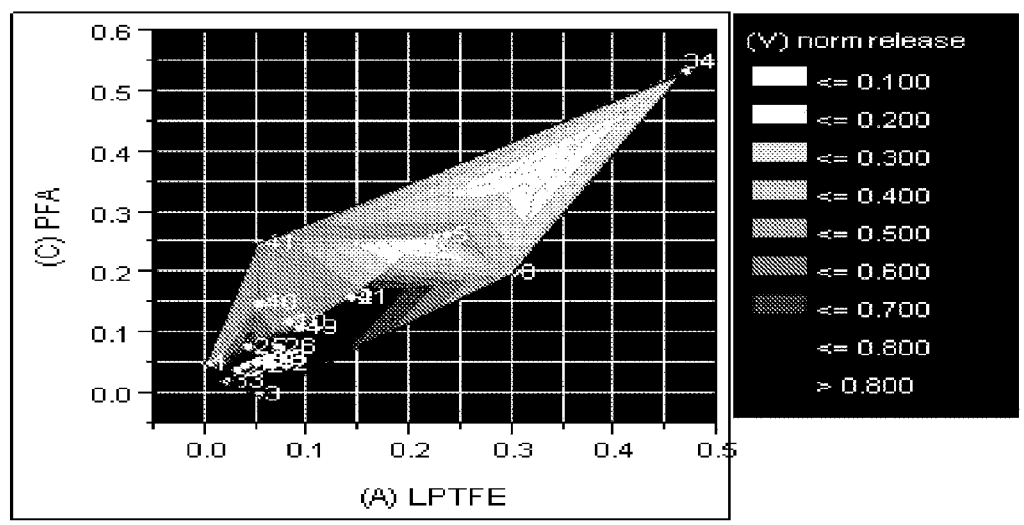
Figure 34:
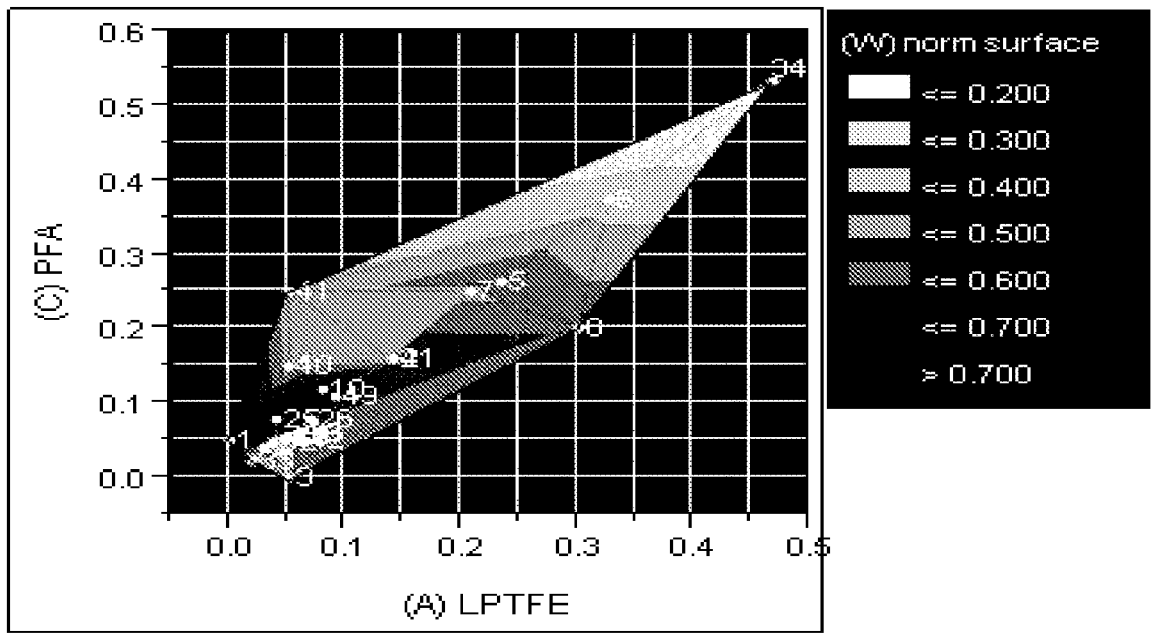
Figure 35:
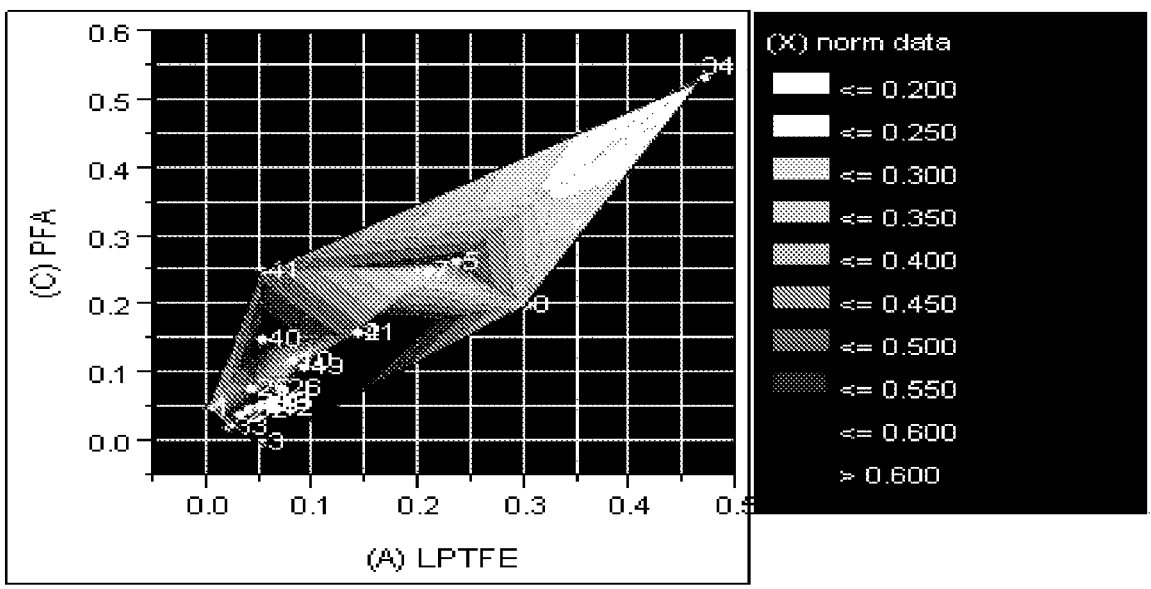

FIG. 23 shows the normalized data obtained by Equation 1 above, in which it may be seen that, in one embodiment, a beneficial combination of properties are obtained by a topcoat including approximately between 5 wt. % and 15 wt. % LPTFE and between 5 wt. % and 15 wt. % MPF, with the remainder HPTFE, based on the total solids weight of all fluoropolymers in the topcoat.

Example 9

Further Topcoat Formulations

Table 18 below sets forth formulations for additional topcoats prepared as described above. Topcoats 1-10 are a restatement of Topcoats 1-10 of the Examples above, and are included below together with additional formulations, all of which are formulated with LPTFE produced by dispersion polymerization or emulsion polymerization and which was not thereafter not agglomerated, irradiated, or thermally degraded. Topcoats 11-17 of the Examples above have been omitted from Table 18 as same are formulated with LPTFFE micropowders. Topcoats 18-52 below were prepared using either Basecoat A or B of Example 1 as defined in the key for Tables 18 and 19, below.

TABLE 18

Further topcoat formulations

| Topcoat # | Topcoat Type | (A) LPTFE | (B) HPTFE | (C) PFA | (D) SFN-DNs | (E) SFN-D | (F) LDW-410 | (G) TE-3887N | (H) 6900GZ | (I) TE7224 | (J) D-310 | (K) TF5035Z | (L) SFN-CO1 |
|---|---|---|---|---|---|---|---|---|---|---|---|---|---|
| 1 | 6900 D310 | 0 | 0.949 | 0.051 | 0 | 0 | 0 | 0 | 4.1 | 0 | 76.6 | 0 | 0 |
| 1 | 6900 D310 | 0 | 0.949 | 0.051 | 0 | 0 | 0 | 0 | 4.1 | 0 | 76.6 | 0 | 0 |
| 1 | 6900 D310 | 0 | 0.949 | 0.051 | 0 | 0 | 0 | 0 | 4.1 | 0 | 76.6 | 0 | 0 |
| 1 | 6900 D310 | 0 | 0.949 | 0.051 | 0 | 0 | 0 | 0 | 4.1 | 0 | 76.6 | 0 | 0 |
| 2 | SFND 6900 D310 | 0.03 | 0.93 | 0.04 | 2.4 | 0 | 0 | 0 | 3.2 | 0 | 74.8 | 0 | 0 |
| 2 | SFND 6900 D310 | 0.03 | 0.93 | 0.04 | 2.4 | 0 | 0 | 0 | 3.2 | 0 | 74.8 | 0 | 0 |
| 3 | SFND D310 | 0.052 | 94.8 | 0 | 4.2 | 0 | 0 | 0 | 0 | 0 | 76.6 | 0 | 0 |
| 4 | SFND 7224 D310 | 0.141 | 0.7 | 0.159 | 0 | 11.7 | 0 | 0 | 0 | 11.8 | 57.7 | 0 | 0 |
| 5 | SFND 7224 D310 | 0.235 | 0.5 | 0.265 | 0 | 19.7 | 0 | 0 | 0 | 19.5 | 41.9 | 0 | 0 |
| 6 | SFND 7224 D310 | 0.327 | 0.3 | 0.373 | 0 | 26.4 | 0 | 0 | 0 | 30.1 | 24.2 | 0 | 0 |
| 7 | SFND 7224 D310 | 0.209 | 0.54 | 0.251 | 0 | 17.1 | 0 | 0 | 0 | 20.5 | 44.1 | 0 | 0 |
| 8 | SFND 7224 D310 | 0.3 | 0.5 | 0.2 | 0 | 24.9 | 0 | 0 | 0 | 14.6 | 41.6 | 0 | 0 |
| 9 | SFND 7224 D310 | 0.047 | 0.9 | 0.053 | 0 | 3.9 | 0 | 0 | 0 | 4.4 | 73.2 | 0 | 0 |
| 9 | SFND 7224 D310 | 0.047 | 0.9 | 0.053 | 0 | 3.9 | 0 | 0 | 0 | 4.4 | 73.2 | 0 | 0 |
| 10 | SFND 6900 D310 | 0.08 | 0.8 | 0.12 | 6.5 | 0 | 0 | 0 | 9.7 | 0 | 64.4 | 0 | 0 |
| 10 | SFND 6900 D310 | 0.08 | 0.8 | 0.12 | 6.5 | 0 | 0 | 0 | 9.7 | 0 | 64.4 | 0 | 0 |
| 18 | SFND 7224 D310 | 0.1 | 0.5 | 0.4 | 0 | 8 | 0 | 0 | 0 | 32.2 | 40.3 | 0 | 0 |
| 19 | SFND 6900 D310 | 0.06 | 0.88 | 0.06 | 4.8 | 0 | 0 | 0 | 4.8 | 0 | 70.6 | 0 | 0 |
| 20 | SFND 6900 D310 | 0.06 | 0.88 | 0.06 | 4.8 | 0 | 0 | 0 | 4.8 | 0 | 70.6 | 0 | 0 |
| 21 | SFND 7224 D310 | 0.14 | 0.7 | 0.16 | 0 | 11.3 | 0 | 0 | 0 | 12.9 | 56.5 | 0 | 0 |
| 25 | SFND 6900 D310 | 0.04 | 0.88 | 0.08 | 3.2 | 0 | 0 | 0 | 6.5 | 0 | 70.9 | 0 | 0 |
| 25 | SFND 6900 D310 | 0.04 | 0.88 | 0.08 | 3.2 | 0 | 0 | 0 | 6.5 | 0 | 70.9 | 0 | 0 |
| 25 | SFND 6900 D310 | 0.04 | 0.88 | 0.08 | 3.2 | 0 | 0 | 0 | 6.5 | 0 | 70.9 | 0 | 0 |
| 25 | SFND 6900 D310 | 0.04 | 0.88 | 0.08 | 3.2 | 0 | 0 | 0 | 6.5 | 0 | 70.9 | 0 | 0 |
| 26 | SFND 6900 D310 | 0.07 | 0.85 | 0.08 | 5.6 | 0 | 0 | 0 | 6.5 | 0 | 68.5 | 0 | 0 |
| 27 | SFND 6900 D310 | 0.07 | 0.85 | 0.08 | 5.6 | 0 | 0 | 0 | 6.5 | 0 | 68.5 | 0 | 0 |
| 27 | SFND 6900 D310 | 0.07 | 0.85 | 0.08 | 5.6 | 0 | 0 | 0 | 6.5 | 0 | 68.5 | 0 | 0 |
| 27 | SFND 6900 D310 | 0.07 | 0.85 | 0.08 | 5.6 | 0 | 0 | 0 | 6.5 | 0 | 68.5 | 0 | 0 |
| 28 | SFND 7224 D310 | 0.07 | 0.85 | 0.08 | 5.6 | 0 | 0 | 0 | 0 | 6.5 | 68.5 | 0 | 0 |
| 28 | SFND 7224 D310 | 0.07 | 0.85 | 0.08 | 5.6 | 0 | 0 | 0 | 0 | 6.5 | 68.5 | 0 | 0 |
| 28 | SFND 7224 D310 | 0.07 | 0.85 | 0.08 | 5.6 | 0 | 0 | 0 | 0 | 6.5 | 68.5 | 0 | 0 |
| 28 | SFND 7224 D310 | 0.07 | 0.85 | 0.08 | 5.6 | 0 | 0 | 0 | 0 | 6.5 | 68.5 | 0 | 0 |
| 29 | SFND 6900 D310 | 0.07 | 0.85 | 0.08 | 0 | 5.6 | 0 | 0 | 6.5 | 0 | 68.5 | 0 | 0 |
| 29 | SFND 6900 D310 | 0.07 | 0.85 | 0.08 | 0 | 5.6 | 0 | 0 | 6.5 | 0 | 68.5 | 0 | 0 |

TABLE 18-continued

Further topcoat formulations

| Topcoat # | Topcoat Type | (A) LPTFE | (B) HPTFE | (C) PFA | (D) SFN-DNs | (E) SFN-D | (F) LDW-410 | (G) TE-3887N | (H) 6900GZ | (I) TE7224 | (J) D-310 | (K) TF5035Z | (L) SFN-CO1 |
|---|---|---|---|---|---|---|---|---|---|---|---|---|---|
| 29 | SFND 6900 D310 | 0.07 | 0.85 | 0.08 | 0 | 5.6 | 0 | 0 | 6.5 | 0 | 68.5 | 0 | 0 |
| 29 | SFND 6900 D310 | 0.07 | 0.85 | 0.08 | 0 | 5.6 | 0 | 0 | 6.5 | 0 | 68.5 | 0 | 0 |
| 30 | SFND 6900 5035 | 0.07 | 0.85 | 0.08 | 0 | 5.6 | 0 | 0 | 6.5 | 0 | 0 | 68.5 | 0 |
| 30 | SFND 6900 5035 | 0.07 | 0.85 | 0.08 | 0 | 5.6 | 0 | 0 | 6.5 | 0 | 0 | 68.5 | 0 |
| 30 | SFND 6900 5035 | 0.07 | 0.85 | 0.08 | 0 | 5.6 | 0 | 0 | 6.5 | 0 | 0 | 68.5 | 0 |
| 30 | SFND 6900 5035 | 0.07 | 0.85 | 0.08 | 0 | 5.6 | 0 | 0 | 6.5 | 0 | 0 | 68.5 | 0 |
| 31 | SFND 7224 D310 | 0.07 | 0.85 | 0.08 | 0 | 5.6 | 0 | 0 | 0 | 6.5 | 68.5 | 0 | 0 |
| 31 | SFND 7224 D310 | 0.07 | 0.85 | 0.08 | 0 | 5.6 | 0 | 0 | 0 | 6.5 | 68.5 | 0 | 0 |
| 32 | SFND 7224 D310 | 0.039 | 0.913 | 0.047 | 0 | 3.2 | 0 | 0 | 0 | 3.9 | 74.4 | 0 | 0 |
| 32 | SFND 7224 D310 | 0.039 | 0.913 | 0.047 | 0 | 3.2 | 0 | 0 | 0 | 3.9 | 74.4 | 0 | 0 |
| 33 | SFND 7224 D310 | 0.02 | 0.957 | 0.023 | 0 | 1.6 | 0 | 0 | 0 | 1.9 | 78 | 0 | 0 |
| 33 | SFND 7224 D310 | 0.02 | 0.957 | 0.023 | 0 | 1.6 | 0 | 0 | 0 | 1.9 | 78 | 0 | 0 |
| 34 | SFND 7224 | 0.467 | 0 | 0.533 | 0 | 37.7 | 0 | 0 | 0 | 43.0 | 0 | 0 | 0 |
| 35 | SFND 7224 D310 | 0.42 | 0.1 | 0.48 | 0 | 33.9 | 0 | 0 | 0 | 38.8 | 8.06 | 0 | 0 |
| 36 | SFND 7224 D310 | 0.047 | 0.9 | 0.053 | 0 | 3.9 | 0 | 0 | 0 | 4.4 | 73.2 | 0 | 0 |
| 36 | SFND 7224 D310 | 0.047 | 0.9 | 0.053 | 0 | 3.9 | 0 | 0 | 0 | 4.4 | 73.2 | 0 | 0 |
| 37 | 3887N 7224 D310 | 0.047 | 0.9 | 0.053 | 0 | 0 | 0 | 4.3 | 0 | 4.3 | 72.8 | 0 | 0 |
| 38 | SFND 7224 D310 | 0.047 | 0.9 | 0.053 | 0 | 3.9 | 0 | 0 | 0 | 4.4 | 73.2 | 0 | 0 |
| 39 | SFND 7224 SFNCO1 | 0.047 | 0.9 | 0.053 | 0 | 3.8 | 0 | 0 | 0 | 4.3 | 0 | 0 | 73.5 |
| 39 | SFND 7224 SFNCO1 | 0.047 | 0.9 | 0.053 | 0 | 3.8 | 0 | 0 | 0 | 4.3 | 0 | 0 | 73.5 |
| 40 | SFND 7224 SFNCO1 | 0.05 | 0.8 | 0.15 | 0 | 4 | 0 | 0 | 0 | 12.4 | 0 | 0 | 65.1 |
| 41 | SFND 7224 SFNCO1 | 0.05 | 0.7 | 0.25 | 0 | 4.1 | 0 | 0 | 0 | 20.3 | 0 | 0 | 57 |
| 42 | 7224 D310 LDW40 | 0.062 | 0.886 | 0.052 | 0 | 0 | 5.1 | 0 | 0 | 4.3 | 72.3 | 0 | 0 |
| 43 | 3887N 7224 D310 | 0.047 | 0.9 | 0.053 | 0 | 0 | 0 | 3.8 | 0 | 4.4 | 73.2 | 0 | 0 |
| 44 | 3887N 7224 SFNCO1 | 0.047 | 0.9 | 0.053 | 0 | 0 | 0 | 3.9 | 0 | 4.4 | 0 | 0 | 73 |
| 45 | 3887N 7224 D310 SFNCO1 | 0.047 | 0.9 | 0.053 | 0 | 0 | 0 | 3.9 | 0 | 4.4 | 36.8 | 0 | 36.3 |
| 46 | 3887N 7224 D310 SFNCO1 | 0.047 | 0.9 | 0.053 | 0 | 0 | 0 | 3.9 | 0 | 4.4 | 55 | 0 | 18.1 |
| 47 | 3887N 7224 D310 SFNCO1 | 0.047 | 0.9 | 0.053 | 0 | 0 | 0 | 3.9 | 0 | 4.4 | 18.4 | 0 | 54.6 |
| 48 | 3887N 7224 D310 | 0.047 | 0.9 | 0.053 | 0 | 0 | 0 | 3.8 | 0 | 4.4 | 73.2 | 0 | 0 |
| 49 | SFND 7224 D310 | 0.09 | 0.8 | 0.11 | 0 | 7.4 | 0 | 0 | 0 | 9 | 65.2 | 0 | 0 |
| 50 | 3887N 7224 D310 | 0.09 | 0.8 | 0.11 | 0 | 0 | 0 | 7.4 | 0 | 9 | 65.2 | 0 | 0 |
| 51 | SFND 7224 D310 | 0.047 | 0.9 | 0.053 | 0 | 3.9 | 0 | 0 | 0 | 4.4 | 72.3 | 0 | 0 |
| 52 | SFND 7224 D310 | 0.047 | 0.9 | 0.053 | 0 | 3.9 | 0 | 0 | 0 | 4.4 | 72.3 | 0 | 0 |

Table 19 below sets forth the results from testing of the topcoats of Table 18.

TABLE 19

Further topcoat formulation test data

| Topcoat # | (M) Dry Egg Release | (N) Burnt Milk Test | (O) Gloss | (P) Contact Angle | (Q) Wet RAT Basecoat A | (R) Wet RAT Basecoat B | (S) MSAT Basecoat A | (T) MSAT Basecoat B | (U) norm abrasion | (V) norm release | (W) norm surface | (X) norm data |
|---|---|---|---|---|---|---|---|---|---|---|---|---|
| 1 | 4 | 2 | 49 | 129 | 60 | . | 6 | . | 0.31 | 0.37 | 0.91 | 0.53 |
| 1 | . | . | . | . | 47 | . | . | . | 0 | . | . | 0 |
| 1 | . | . | . | . | 145 | . | . | . | 0.42 | . | . | 0.42 |
| 1 | . | . | . | . | 139 | . | . | . | 0.39 | . | . | 0.39 |
| 2 | 5 | 4 | 46 | 117 | 167 | . | 8 | . | 0.76 | 1 | 0.6 | 0.78 |
| 2 | . | . | . | . | 154 | . | . | . | 0.46 | . | . | 0.46 |
| 3 | 5 | 3.5 | 46 | 112 | 233 | . | 5 | . | 0.56 | 0.88 | 0.48 | 0.64 |
| 4 | 4.5 | . | 30 | 130 | . | 101 | . | 5 | 0.56 | 0.87 | 0.68 | 0.7 |
| 5 | 3 | . | 22 | 131 | . | 65 | . | 6 | 0.54 | 0.47 | 0.6 | 0.54 |
| 6 | 1.2 | . | 19 | 122 | . | 67 | . | 4 | 0.33 | 0.02 | 0.36 | 0.23 |
| 7 | 1.2 | . | 36 | 117 | . | 30 | . | 4.5 | 0.25 | 0 | 0.47 | 0.24 |
| 8 | 2.5 | . | 19 | 132 | . | 29 | . | 4 | 0.19 | 0.34 | 0.58 | 0.37 |
| 9 | 5 | 4 | . | . | 133 | . | 8 | . | 0.68 | 1 | . | 0.84 |
| 9 | 5 | 4 | . | . | 115 | . | . | . | 0.29 | 1 | . | 0.65 |
| 10 | 4 | 2 | 48 | 126 | 145 | . | 6 | . | 0.49 | 0.37 | 0.83 | 0.56 |
| 10 | . | . | . | . | 50 | . | . | . | 0.01 | . | . | 0.01 |
| 18 | . | . | . | . | . | . | . | . | . | . | . | . |
| 19 | 4 | 2 | 46 | 128 | 88 | . | 6 | . | 0.37 | 0.37 | 0.85 | 0.53 |
| 20 | . | . | . | . | 181 | . | . | . | 0.57 | . | . | 0.57 |
| 21 | 2.6 | . | 43 | 114 | . | 27 | . | 6.5 | 0.46 | 0.47 | 0.49 | 0.47 |
| 25 | 4.5 | 3 | 46 | 129 | 121 | . | 6 | . | 0.44 | 0.68 | 0.87 | 0.66 |
| 25 | . | . | . | . | 188 | . | . | . | 0.6 | . | . | 0.6 |
| 25 | . | . | . | . | 80 | . | . | . | 0.14 | . | . | 0.14 |
| 25 | . | . | . | . | 150 | . | . | . | 0.44 | . | . | 0.44 |
| 26 | 5 | 4 | 46 | 129 | 100 | . | 6 | . | 0.39 | 1 | 0.87 | 0.75 |
| 27 | . | . | . | . | 129 | . | . | . | 0.35 | . | . | 0.35 |
| 27 | 5 | 4 | . | . | 257 | . | 6 | . | 0.73 | 1 | . | 0.86 |
| 27 | . | . | . | . | 83 | . | . | . | 0.15 | . | . | 0.15 |
| 28 | 5 | 4 | 48 | 123 | 281 | . | 8 | . | 1 | 1 | 0.76 | 0.92 |
| 28 | . | . | . | . | 186 | . | . | . | 0.59 | . | . | 0.59 |
| 28 | . | . | . | . | . | . | . | . | . | . | . | . |
| 28 | . | . | . | . | . | . | . | . | . | . | . | . |
| 29 | 5 | 4 | 33 | . | 92 | . | 6 | . | 0.37 | 1 | 0.58 | 0.65 |
| 29 | . | . | . | . | 186 | . | . | . | 0.59 | . | . | 0.59 |
| 29 | 5 | 4 | 37 | . | 69 | . | . | . | 0.09 | 1 | 0.68 | 0.59 |
| 29 | . | . | . | . | 50 | . | . | . | 0.01 | . | . | 0.01 |
| 30 | 5 | 4 | 21 | 131 | 104 | . | 3.5 | . | 0.12 | 1 | 0.59 | 0.57 |
| 30 | . | . | . | . | 96 | . | . | . | 0.21 | . | . | 0.21 |
| 30 | . | . | . | . | 74 | . | . | . | 0.12 | . | . | 0.12 |
| 30 | . | . | . | . | 79 | . | . | . | 0.14 | . | . | 0.14 |
| 31 | 5 | 4 | 34 | 115 | 148 | . | 6.1 | . | 0.5 | 1 | 0.39 | 0.63 |
| 31 | . | . | . | . | 155 | . | . | . | 0.46 | . | . | 0.46 |
| 32 | 5 | 4 | 21 | 114 | 115 | . | 6.1 | . | 0.43 | 1 | 0.2 | 0.54 |
| 32 | . | . | . | . | 135 | . | . | . | 0.38 | . | . | 0.38 |
| 33 | 5 | 4 | 28 | 111 | 162 | . | 6 | . | 0.52 | 1 | 0.22 | 0.58 |
| 33 | . | . | . | . | 86 | . | . | . | 0.17 | . | . | 0.17 |
| 34 | 2 | . | 11 | 118 | . | 22 | . | 2.5 | 0 | 0.32 | 0.16 | 0.16 |
| 35 | . | . | . | . | . | . | . | . | . | . | . | . |
| 36 | 5 | 4 | . | . | 156 | . | 6 | . | 0.51 | 1 | . | 0.76 |
| 36 | 5 | 4 | . | . | 100 | . | . | . | 0.23 | 1 | . | 0.61 |
| 37 | 5 | . | 33 | 129 | . | 66 | . | 6 | 0.55 | 1 | 0.7 | 0.75 |
| 38 | 5 | . | 37 | 130 | . | 75 | . | 7 | 0.69 | 1 | 0.77 | 0.82 |
| 39 | 3 | . | 25 | 111 | . | 48 | . | 6 | 0.48 | 0.47 | 0.18 | 0.38 |
| 39 | 3 | . | 25 | 132 | . | 59 | . | 5 | 0.41 | 0.47 | 0.66 | 0.52 |
| 40 | 3 | . | 24 | 124 | . | 161 | . | 6 | 0.89 | 0.47 | 0.47 | 0.61 |
| 41 | 3.1 | . | 18 | 126 | . | 85 | . | 4.9 | 0.49 | 0.5 | 0.43 | 0.48 |
| 42 | 4.6 | . | 29 | 128 | . | 51 | . | 6 | 0.49 | 0.89 | 0.62 | 0.67 |
| 43 | 5 | . | 33 | 126 | . | 47 | . | 6 | 0.48 | 1 | 0.63 | 0.7 |
| 44 | 2.6 | . | 34 | 132 | . | 46 | . | 6 | 0.48 | 0.41 | 0.78 | 0.56 |
| 45 | 3.8 | . | 34 | 132 | . | 60 | . | 6 | 0.53 | 0.72 | 0.78 | 0.67 |
| 46 | 4.2 | . | 35 | 131 | . | 58 | . | 6 | 0.52 | 0.82 | 0.77 | 0.7 |
| 47 | 4 | . | 34 | 130 | . | 55 | . | 6 | 0.51 | 0.77 | 0.73 | 0.67 |
| 48 | 4.6 | . | 33 | 130 | . | 59 | . | 6.2 | 0.54 | 0.93 | 0.72 | 0.73 |
| 49 | 1.5 | . | 37 | 133 | . | 63 | . | 6.5 | 0.59 | 0.2 | 0.84 | 0.54 |
| 50 | 5 | . | 33 | 127 | . | 42 | . | 6.5 | 0.52 | 1 | 0.65 | 0.72 |
| 51 | 4.6 | . | 39 | 133 | . | 36 | . | 7 | 0.55 | 0.91 | 0.87 | 0.78 |
| 52 | 4.8 | . | 34 | 128 | . | 35 | . | 6 | 0.44 | 0.95 | 0.69 | 0.69 |

Certain headings of Tables 18 and 19 are keyed with letters A-X as set forth below.

A) The volume solids of the LPTFE component as a fraction of the total fluoropolymer (FP) content (1.0) in the topcoat formula. For example, 0.07 would mean that 7% by volume of the total FP volume solids is LPTFE.

B) The volume solids of the HPTFE component as a fraction of the total FP content (1.0) in the topcoat formula.

C) The volume solids of the PFA component (a melt processible fluoropolymer (MPF)) as a fraction of the total FP content (1.0) in the topcoat formula.

D) Percent volume solids of Chenguang SFN-DNs (25% weight solids unstabilized LPTFE dispersion) in the total topcoat dry film volume.

E) Percent volume solids of Chenguang SFN-D (50% weight solids stabilized LPTFE dispersion) in the total topcoat dry film volume.

F) Percent volume solids of Daikin LDW-410 (60% weight solids stabilized LPTFE dispersion) in the total topcoat dry film volume.

G) Percent volume solids of DuPont Zonyl TE-3887N (60% weight solids stabilized LPTFE dispersion) in the total topcoat dry film volume.

H) Percent volume solids of Dyneon PFA 6900GZ (50% weight solids stabilized MPF dispersion) in the total topcoat dry film volume.

I) Percent volume solids of DuPont TE-7224 PFA (60% weight solids stabilized MPF dispersion) in the total topcoat dry film volume.

J) Percent volume solids of Daikin D-310 (60% weight solids stabilized HPTFE dispersion) in the total topcoat dry film volume.

K) Percent volume solids of Dyneon TF 5035Z (58% weight solids stabilized HPTFE dispersion) in the total topcoat dry film volume.

L) Percent volume solids of Chenguang SFN-CO1 (60% weight solids stabilized HPTFE dispersion) in the total topcoat dry film volume.

M) Dry egg release (DER) test result, rated 1-5, with 5 best.

N) Burnt milk release test result, rated 1-4, with 4 best.

O) Gloss reading recorded as % reflectance using a 60° glossmeter.

P) Contact angle measurement in degrees using water.

Q) Wet reciprocating abrasion test (RAT) with topcoats applied over Basecoat A. Results expressed in WRAT cycles per micron of total film build measured in microns (combined basecoat and topcoat film thicknesses).

R) Wet reciprocating abrasion test (RAT) with topcoats applied over Basecoat B. Results expressed in WRAT cycles per micron of total film build measured in microns (combined basecoat and topcoat film thicknesses).

S) Mechanical Scratch Adhesion Test (MSAT) results with topcoats applied over Basecoat A. Ratings=1-9, with 9 best.

T) Mechanical Scratch Adhesion Test (MSAT) results with topcoats applied over Basecoat B. Ratings=1-9, with 9 best.

U) Normalized abrasion test results, as calculated from the following equation:

$$\text{Mean}\{[(Q)\text{Wet RAT Basecoat } A-\text{Minimum}((Q)\text{Wet RAT Basecoat } A)]/[\text{Maximum}((Q)\text{Wet RAT Basecoat } A-\text{Minimum}((Q)\text{Wet RAT Basecoat } A)],$$

$$[(R)\text{Wet RAT Basecoat } B-\text{Minimum}((R)\text{Wet RAT Basecoat } B)]/[\text{Maximum}((R)\text{Wet RAT Basecoat } B-)-\text{Minimum}((R)\text{Wet RAT Basecoat } B)],$$

$$[\text{MSAT Basecoat } A-\text{Minimum}(\text{MSAT Basecoat } A)]/[\text{Maximum}(\text{MSAT Basecoat } A)-\text{Minimum}(\text{MSAT Basecoat } A],$$

$$[\text{MSAT Basecoat } B-\text{Minimum}(\text{MSAT Basecoat } B)]/[\text{Maximum}(\text{MSAT Basecoat } B)-\text{Minimum}(\text{MSAT Basecoat } B)]\}$$

V) Normalized release test results, as calculated from the following equation:

$$\text{Mean}\{[(M)\text{Dry Egg Release}-\text{Minimum}((M)\text{Dry Egg Release})]/[\text{Maximum}((M)\text{Dry Egg Release}-\text{Minimum}((M)\text{Dry Egg Release})],$$

$$[(N)\text{Burnt Milk Test}-\text{Minimum}(((N)\text{Burnt Milk Test})]/[\text{Maximum}((N)\text{Burnt Milk Test}-)-\text{Minimum}((N)\text{Burnt Milk Test})]\}$$

W) Normalized surface test results, as calculated from the following equation:

$$\text{Mean}\{[(O)\text{Gloss}-\text{Minimum}((O)\text{Gloss})]/[\text{Maximum}((O)\text{Gloss})-\text{Minimum}((O)\text{Gloss})],$$

$$[(P)\text{Contact Angle}-\text{Minimum}((P)\text{Contact Angle})]/[\text{Maximum}((P)\text{Contact Angle})-\text{Minimum}((P)\text{Contact Angle})]\}$$

X) Normalized all test results, as calculated from the following equation:

$$\text{Mean}\{(U)\text{norm abrasion},(V)\text{norm release},(W)\text{norm surface}\}$$

FIGS. 24-36 show contour plots derived from the data of Table 19 which indicate that beneficial properties are observed for topcoats that, in one embodiment, contain between 5-20 wt. % of LPTFE and 5-20 wt. % of MPF and, in another embodiment, contain between 5-15 wt. % LPTFE and 5-15 wt. % MPF, based on total fluoropolymer content.

Test Methods

The test protocols of the reciprocating abrasion test (RAT), the mechanical scratch adhesion test, the burnt milk adhesion test, and the dry egg release test are set forth below.

I. Reciprocating Abrasion Test (RAT)

The reciprocation abrasion test was conducted under the following modified conditions with respect to the complete test protocol set forth below: (1) the coated samples were tested until 10% exposure of substrate; (2) the test was performed using a 3 kg weight at ambient temperature; (3) the Scotchbrite 3M (7447) pads were changed every 2000 cycles; and (4) the test was run wet by adding 120 ml of a 0.5% solution of Triton X-100 in deionized water to the pan prior to beginning test.

The complete test protocol is as follows:

Scope. This test measures the resistance of coatings to abrasion by a reciprocating Scotch-Brite pad. The test subjects coating abrasion in a back and forth motion. The test is a measure of the useful life of coatings that have been subjected to scouring and other similar forms of damage caused by cleaning TM 135C is specific to a test apparatus built by Whitford Corporation of West Chester, Pa. However, it is applicable to similar test methods such as the one described in British Standard 7069-1988.

Equipment and Materials.

(1) A test machine capable of holding a Scotch-Brite abrasive pad of a specific size to the surface to be tested with a fixed force and capable of moving the pad in a back and forth (reciprocating) motion over a distance to 10-15 cm (4 to 6 inches). The force and motion are applied by a free falling, weighted stylus. The machine must be equipped with a counter, preferably one that may be set to shut off after a given number of cycles.

(2) Scotch-Brite pads of required abrasiveness cut to required size. Scotch-Brite pads are made by 3M Company, Abrasive Systems Division, St Paul, Minn. 2525144-1000. Pads come in grades with varying levels of abrasiveness as follows:

Lowest—7445, 7448, 6448, 7447, 6444, 7446, 7440, 5440—Highest

Scotch-Brite pads may be used at temperatures up to 150° C. (300° F.). Equivalent pads may be used.

(3) Hot plate to heat test specimens. (Optional)

(4) Detergent solution or oil for performing test in with a liquid. (Optional)

Procedure.

Before beginning the test, the end point must be defined. Usually, the end point is defined when some amount of substrate has been exposed. However, the end point may be defined as a given number of strokes even if substrate is not exposed. The present inventors use a 10% exposure of substrate over the abraded area as the standard definition of end point. Other end points may be used.

Secure the part to be tested under the reciprocating pad. The part must be firmly fastened with bolts, clamps or tape. The part should be as flat as possible and long enough so that the pad does not run off an edge. Bumps in the surface will wear first, and overrunning an edge can tear the pad and cause premature scratching and a false result.

Cut a piece of Scotch Brite of required abrasiveness to the exact size of the "foot" of the stylus. The present inventors use Grade 7447 as standard, and the "foot" of the stylus on the test machine is 5 cm (2 inches) in diameter. Attach the pad to the bottom of the "foot." The Scotch-Brite pad is fixed to the "foot" by means of a piece of "Velcro" glued to the bottom of the foot.

If the machine has an adjustable stroke length, set the required length. The present inventors use a 10 cm (4 inch) stroke length as standard. Lower the pad onto the surface of the piece to be tested. Make sure that the weight is completely free. The present inventors used a 3.0 Kg weight as standard, but this can be varied.

If the machine is equipped with a counter, set the counter to the required number of strokes. One stroke is a motion in one direction. If the machine does not have an automatic counter, the counter must be watched so that the machine can be turned off at the proper time. The machine is stopped at various intervals to change the abrasive pad. The abrasiveness of the pad changes (usually becomes less effective) as the pad fills with debris. The present inventors changed pads at intervals of 2,000 strokes. One thousand strokes is the preferred interval between pad changes.

Start the test machine. Allow to run until an end point is reached or until a required number of strokes are attained before changing the pad.

Inspect the test piece carefully at the beginning and end of each start up. As the end point is approached, the substrate will begin to show through the coating. When close to the end point, observe the test piece constantly. Stop the machine when the end point has been reached.

Evaluation.

Record the following for the test machine:
1. Grade and size of Scotch-Brite pad.
2. Load on stylus
3. Number of strokes between pad changes.
4. Length of stroke.
5. Definition of end point.
6. Number of strokes to end point.

Duplicate tests provide greater reliability. Indicate if end point is a single result or the average of several results.

Record the description of the coating, the film thickness, and the substrate and surface preparation.

If the test is conducted to a specific number of strokes, record the number of strokes. Record a description of the amount of wear, such as percent of substrate exposed, or number of strokes to first substrate exposure. Optionally, record the film thickness and/or weight before and after testing.

If the test is performed at elevated temperature, record the temperature of the test. If performed with a liquid, record the specifics of the liquid.

Comments/Precautions.

Both sides of a Scotch-Brite pad may be used. Pads must be cut precisely to fit the "foot." Ragged edges or rough spots on the pad will give false results. Test pieces must be flat and free from dirt or other particles. This test method is similar to the abrasion test described in BS 7069:1988, Appendix A1. When tested according to BS 7069, test pieces are immersed in 50 $cm^3$ of a 5 g/liter solution of household dish washing detergent in water. The test runs for 250 cycles with pads changed every 50 cycles.

II. Mechanical Scratch Adhesion Test (MSAT)

1. Scope. Coatings for cookware are susceptible to abuse and damage by scratching and cutting with metal utensils. This method describes a procedure and equipment that inflicts abuse on coatings, is reproducible, objective and quick. A weighted ball point pen tip affixed to a balance arm is placed on the coated surface which is revolving on a turntable. At the same time, the balance arm oscillates from side to side by means of a revolving cam. The turntable and cam are driven by constant speed DC motors. The speed of the turntable and cam are controlled by variable DC power supplies. The amplitude of oscillation is controlled by the degree of eccentricity in the cam. The weight is variable. By adjusting the speeds of the motors and the amplitude various scratch patterns may be obtained. These can be adjusted to cover a small or large surface area.

To further simulate the conditions encountered by coatings for nonstick cookware, the test piece (panel or pan) is covered with hot oil. The temperature of the oil is maintained with IR heat lamps and is monitored with a thermometer or thermocouple.

2. Equipment and Materials 2.1 Mechanical scratch adhesion apparatus with set of weights.

2.2 Medium point standard ball point pen refill cartridges (Pentech Part #85330 or equivalent).

2.3 Hot plate.

2.4 Cooking oil.

2.5 Thermometer or digital read out with thermocouple wire.

2.6 Small 'C' clamps.

2.7 Shallow pan approximately 10 inches (25 cm) in diameter.

2.8 Set (2 or 3) of 250 watt infrared heating lamps on stands.

3. Procedure.

3.1 Insert a ball point pen refill into the stylus assembly. (Note—a new pen refill is used for each test.) Check the balance and level of the balance arm with test piece in position. Adjust if necessary. Remove the test piece. Set the amplitude of the oscillation by choosing the proper cam setting. (Typical cam setting is the second screw hole from the center.) Set the minimum and maximum radius by loosening the balance arm retaining screw and adjusting at the extremes of the cam. Usually, a center circle of about 2 inches (51 mm) is allowed in the test pattern.

3.2 Without weight on the balance arm, and holding the pen above the turntable, adjust the speed of the turntable and the cam. It is important to adjust the speed of both the turntable and the cam so that repeating patterns are eliminated or minimized. The pen should travel in a new path over as much of the wear area as possible. Although other speeds may be acceptable, the following speeds have reduced start-up problems.

Turntable: 15 rpm. or 10 revolutions in 39.4-39.6 seconds
Cam: 21 rpm. or 10 revolutions in 28.5-28.9 seconds 3.3 Place a piece of paper on the turntable and hold in place with tape. Load the pen with a lightweight (approx. 200 grams). Place the pen on the paper and trace the scratch pattern it will follow. If a repeating pattern occurs, adjust the speed of either the turntable or cam. Save the pattern. This is also a check of the functioning of the pen. If it does not write, replace it.

3.4 Remove paper. Center pan on turntable. If testing panels, place shallow pan on turntable and place panels in pan. Panels must be of a size large enough to accommodate the size of the scratch pattern. Using 'C' clamps, anchor the pan and panel to the turntable. Holding the pen above the test piece, turn on the turntable and cam and observe several revolutions to ensure that the scratch pattern is entirely on the test piece. Turn the unit off.

3.5 Heat sufficient cooking oil to cover test surface by about ⅛ to ¼ inch (3-6 mm). Heat to test temperature, typically 300° F. (150° C.). (CAUTION: Above about 150° C., cooking oils emit fumes and strong odors. Also, they become quite flammable. If running over 150° C., conduct test in a well ventilated area, preferably in a fume hood.) Pour hot oil into pan. Position IR lamps close to pan and turn on to maintain temperature of the oil. Some pretesting of the proper position of the lamps will be required to maintain the temperature within a range of 40° F. (5° C.). Monitor every 5 minutes during test, and adjust position of the lamps to hold this tolerance. (A continuously reading temperature gauge is most convenient for this measurement.)

3.6 Place the proper weight on the balance arm. Typically, this will vary from 250 to 1000 grams, with 500 grams being used most frequently. Start both motors and place the pen gently on the coated surface. Allow the test to run for the required length of time.

4. Evaluation 4.1 Record the following information:
Speed of turntable and cam in rpm
Cam amplitude setting (number or distance from inside to outside radius in cm)
Load on pen point in grams
Temperature of oil
Duration of test
All test piece parameters (substrate and substrate preparation, coating, thickness, cure, etc.)

4.2 Remove test piece, drain oil, and wash in warm water and mild detergent. Blot dry with paper towel. Visually observe the damage to the coating. This may be done on a comparative basis against other test specimens. In general, performance levels have been rated as follows:

| Mechanical Scratch Test Ratings |
|---|
| 9 No effect. Light scratching of the surface. No breakthrough at any place in the scratch pattern. |
| 8 Slight. Light scratching of the surface. Inner circle of pattern is showing slight cut through to basecoat and possibly some cuts to substrate. Outer circle not cut through. |
| 6 Moderate. Moderate scratching between inner and outer circle. Inner and outer circle both cut through to basecoat and possibly to substrate (inner usually worse that outer). |
| 4 Considerable. Less than 25% loss of coating between inner and out circle (estimate and record amount). Considerable cut through to substrate and fraying at the inner and outer circles. |
| 2 Severe. Between 25% to 50% loss of coating adhesion between inner and outer circle. Severe loss of coating at inner and outer circles. Metal substrate quite apparent. |
| 0 Total Failure. Greater than 50% loss of adhesion and coating surface. |

5. Comments/Precautions.

5.1 The preferred approach to running this test is to establish a set of operating parameters for the turntable and cam speeds, the oscillating amplitude, and oil temperature. Then vary the load or time. Once this has been established, setting up individual tests proceeds quickly and smoothly.

5.2 Check the balance and oscillation of the balance arm frequently to ensure that it has not become loose and changed.

5.3 Check the speed of the turntable and cam frequently, and adjust accordingly.

5.4 This test can be run cold, i.e., without hot oil.

5.5 With a different stylus and with no rotation of the cam, this test may be run as the Ball Penetration Test, Whitford Test Method 137B. Other styli may be used as well to test for different properties.

III. Burnt Milk Adhesion Test

This test is basically the same as that described by the Cookware Manufacturer's Association (Burnt Milk Adhesion Test: CMA 21.6.2) but was modified to use less milk (150 ml vs. 237 ml). As the milk tends to adhere more before complete carbonization, the test was stopped when the milk 'pancake' surface was >95% browned (a few tan, lighter areas still apparent). And, a rating system other than pass/fail was added. After turning off heat to pan, lift an edge (~1 cm in from edge) of the hot 'pancake' with a spatula. Allow this edge to cool ~30 seconds. After cooling, lift the 'pancake' by this cooled edge from the pan. Rate results by the following system from best to worst:

| | Burnt Milk Adhesion Test Ratings |
|---|---|
| 4 | 'pancake' can be removed from pan intact by lifting from edge |
| 3 | 'pancake' can be lifted from pan with some breakage, but no assistance with spatula |
| 2 | 'pancake' can be completely removed from the pan but only with the help of the spatula |
| 1 | 'pancake' cannot be completely removed from pan with the aid of the spatula |

IV. Egg Release Test

1. Scope. This procedure is used as a quick method of determining the ability of food to be released from a nonstick coating for cookware. When used with care, this test may be used as an on-line control test to measure the consistency of production. The test is somewhat subjective and dependent upon the equipment used and the technique of the tester.

2. Equipment and Materials.

2.1 8 inch (20 cm) electric stove burner rated 1500 watts or gas range burner.

2.2 Contact pyrometer or IR temperature gun (capable of measuring to 500° F./260° C.).

2.3 Plastic, metal or coated metal spatula.

2.4 Timer or watch with second hand.

2.5 Cold, fresh, large size hen eggs.

2.6 Tap water, mild dish detergent, paper towels.

3. Procedure.

3.1 Wash coated utensil to be tested with tap water and mild detergent solution. Rinse several times in hot tap water and blot dry with a paper towel.

3.2 Turn on electric or gas burner to a medium setting ("5" on an electric burner or one-half on for gas). Allow burner to come to temperature for 3-5 minutes.

3.3 Place the utensil on the center of burner. Allow to heat while monitoring the temperature with the pyrometer or IR temperature gun. Allow the utensil to heat to 290-310° F. (143-154° C.). Alternately, if a pyrometer is not available, the temperature may be judged by sprinkling a few drops of water onto the surface periodically as the utensil heats. The test temperature has been reached when the drops of water steam and "dance" immediately upon contact with the surface.

3.4 Crack and gently place the contents of one cold, fresh egg in the center of the utensil. Do not tip or swirl the utensil or cause the egg to run.

3.5 Allow the egg to cook for two (2) minutes undisturbed. Monitor temperature of the pan as the egg cooks. Record the temperature of the utensil. The temperature on the utensil should rise to 380-420° F. (193-215° C.) at the end of two minutes. If the end point temperature is outside this range, adjust the burner control up or down as appropriate and repeat the test. (Note: The correct burner control setting may be determined in advance using a separate utensil of the same construction as the test utensil.)

3.6 At the end of two minutes, lift egg with spatula. Free egg completely from the surface, noting the amount of effort required. Once the egg has been freed, remove the utensil from the burner and tilt. Note the ease or difficulty with which the egg slides in the bottom of the utensil.

3.7 Return utensil to burner. Turn egg over and break yolk with spatula. Allow egg to cook another two (2) minutes. Repeat Step 3.6. In addition, make note of any staining and the amount of material adhering to the utensil.

4. Evaluation.

4.1 Record effort required to free egg from surface. Egg that lifts easily from surface with no sticking around edges indicates excellent release. Diminishing release down to complete sticking may be noted by amount of effort required to lift the egg.

4.2 A numerical and descriptive rating system is as follows:

| Egg Release Test Ratings | |
|---|---|
| Excellent (5) | No sticking in center or edges of egg. Slides easily without pushing with spatula. Leaves no mark or residue. |
| Good (4) | Slight sticking around edges. Slides easily if moved with spatula. Leaves slight mark, but no residue. |
| Fair (3) | Moderate sticking on edges; slight sticking in center. Slides only if steeply tilted and shaken, and must be pushed with spatula. Leaves mark, and slight residue. |
| Poor (2) | Requires considerable effort to free egg, but can be freed intact with spatula. Does not slide. Leaves moderate residue. |
| Very Poor (1) | Egg cannot be freed from surface without breaking up. |

4.3 If a control sample is available, record results as much better than, better than, equal, worse than or much worse than the control.

5. Comments/Precautions.

5.1 The results of this test are subjective and are best applied on a relative basis using a known standard as control. Repeatability will be good for the same tester and equipment. Repeatability will be improved with experienced testers using the same equipment.

5.2 Results may vary if utensils of different materials of construction or size are compared. In every case, the burner control settings should be adjusted to provide the same heat up profile for best correlation of results.

V. 60° Gloss

Gloss measurements were obtained using a Microgloss 60° glossmeter, available from Byk-Gardner. The gloss meter conformed to the following standards: BS3900/D5, DIN EN ISO 2813, DIN 67530, EN ISO 7668, ASTM D523, ASTM D1455, ASTM C346, ASTM C584, ASTM D2457, JIS Z 8741, MFT 30064, TAPPI T 480. Units of measurement are expressed as % reflectance.

VI. Contact Angle

Contact angle was measured for a water droplet and is expressed in degrees, as determined according to ASTM D7334-08 using the "Drop Shape Analysis" system (DSA10), available from Kruss GmbH of Hamburg, Germany, according to the Young Relation.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A coated article, comprising:
 a rigid substrate; and
 a coating on said rigid substrate, comprising:
  at least one high molecular weight polytetrafluoroethylene (HPTFE) having a number average molecular weight ($M_n$) of at least 500,000 and present in an amount of between 30 wt. % and 96 wt. % based on the total solids weight of all fluoropolymers in said coating;
  at least one low molecular weight polytetrafluoroethylene (LPTFE) having a number average molecular weight ($M_n$) of less than 500,000; and
  at least one melt-processible fluoropolymer (MPF).

2. The coated article of claim 1, wherein said at least one high molecular weight polytetrafluoroethylene (HPTFE) is present in an amount of between 60 wt. % and 96 wt. % and said at least one low molecular weight polytetrafluoroethylene (LPTFE) and said at least one melt-processible fluoropolymer (MPF) are together present in an amount of between 4 wt. % and 40 wt. % based on the total solids weight of all fluoropolymers in said coating.

3. The coated article of claim 1, wherein said at least one low molecular weight polytetrafluoroethylene (LPTFE) is present in an amount between 2 wt. % and 15 wt. % and said at least one melt-processible fluoropolymer (MPF) is present in an amount of between 2 wt. % and 15 wt. % based on the total solids weight of all fluoropolymers in said coating.

4. The coated article of claim 1, wherein said at least one melt-processible fluoropolymer (MPF) comprises perfluoroalkoxy (PFA) present in an amount between 20 wt. % and 85 wt. % based on the total solids weight of said at least one low molecular weight polytetrafluoroethylene (LPTFE) and said at least one melt-processible fluoropolymer (MPF).

5. The coated article of claim 4, wherein said at least one melt-processible fluoropolymer (MPF) comprises perfluoroalkoxy (PFA) present in an amount between 37 wt. % and 65 wt. % based on the total solids weight of said at least one low molecular weight polytetrafluoroethylene (LPTFE) and said at least one melt-processible fluoropolymer (MPF).

6. The coated article of claim 1, wherein said coating has a contact angle of at least 110°.

7. The coated article of claim 1, wherein said coating has a measured gloss of at least 25% reflectance at 60°.

8. The coated article of claim 1, wherein said coating has a surface roughness (Ra) of less than 100 nm.

9. The coated article of claim 1, wherein said at least one high molecular weight polytetrafluoroethylene (HPTFE) is present in an amount of between 85 wt. % and 95 wt. %, and said at least one low molecular weight polytetrafluoroethylene (LPTFE) and said at least one melt-processible fluoropolymer (MPF) are together present in an amount of between 5 wt. % and 15 wt. %, based on the total solids weight of all fluoropolymers in said coating.

10. The coated article of claim 9, wherein said at least one high molecular weight polytetrafluoroethylene (HPTFE) is present in an amount of between 90 wt. % and 95 wt. %, and said at least one low molecular weight polytetrafluoroethylene (LPTFE) and said at least one melt-processible fluoropolymer (MPF) are together present in an amount of between 5 wt. % and 10 wt. %, based on the total solids weight of all fluoropolymers in said coating.

11. The coated article of claim 1, wherein said at least one melt-processible fluoropolymer (MPF) comprises perfluoroalkoxy (PFA), said high molecular weight polytetrafluoroethylene (HPTFE) is present in an amount of between 85 wt. % and 95 wt. %, and said at least one low molecular weight polytetrafluoroethylene (LPTFE) and said at least one melt-processible fluoropolymer (MPF) are together present in an amount of between 5 wt. % and 15 wt. %, based on the total solids weight of all fluoropolymers in said coating.

12. The coated article of claim 11, wherein said at least one melt-processible fluoropolymer (MPF) comprises perfluoroalkoxy (PFA), said high molecular weight polytetrafluoroethylene (HPTFE) is present in an amount of between 90 wt. % and 95 wt. %, and said at least one low molecular weight polytetrafluoroethylene (LPTFE) and said at least one melt-processible fluoropolymer (MPF) are together present in an amount of between 5 wt. % and 10 wt. %, based on the total solids weight of all fluoropolymers in said coating.

13. The coated article of claim 1, wherein said at least one low molecular weight polytetrafluoroethylene (LPTFE) is present in an amount between 40 wt. % and 60 wt. % and said at least one melt-processible fluoropolymer (MPF) is present in an amount of between 40 wt. % and 60 wt. % based on the total solids weight of said at least one LPTFE and said at least one MPF.

14. The coated article of claim 13, wherein said at least one low molecular weight polytetrafluoroethylene (LPTFE) is present in an amount between 45 wt. % and 55 wt. % and said at least one melt-processible fluoropolymer (MPF) is present in an amount of between 45 wt. % and 55 wt. % based on the total solids weight of said at least one LPTFE and said at least one MPF.

15. The coated article of claim 1, wherein said at least one melt-processible fluoropolymer (MPF) comprises perfluoroalkoxy (PFA), said at least one low molecular weight polytetrafluoroethylene (LPTFE) is present in an amount between 40 wt. % and 60 wt. % and said PFA is present in an amount of between 40 wt. % and 60 wt. % based on the total solids weight of said at least one LPTFE and said PFA.

16. The coated article of claim 15, wherein said at least one melt-processible fluoropolymer (MPF) comprises perfluoroalkoxy (PFA), said at least one low molecular weight polytetrafluoroethylene (LPTFE) is present in an amount between 45 wt. % and 55 wt. % and said PFA is present in an amount of between 45 wt. % and 55 wt. % based on the total solids weight of said at least one LPTFE and said PFA.

17. The coated article of claim 1, wherein said at least one high molecular weight polytetrafluoroethylene (HPTFE) includes a modifying co-monomer in an amount less than 1 wt. % based on the weight of said high molecular weight polytetrafluoroethylene (HPTFE).

18. The coated article of claim 17, wherein said modifying co-monomer is a perfluoroalkylvinyl ether.

19. The coated article of claim 18, wherein said modifying co-monomer is perfluoropropylvinyl ether (PPVE).

20. The coated article of claim 17, wherein said coating has a contact angle of at least 110°.

21. The coated article of claim 20, wherein said coating has a contact angle of at least 120°.

22. The coated article of claim 17, wherein said coating has a measured gloss of at least 25% reflectance at 60°.

23. The coated article of claim 17, wherein said coating has a surface roughness (Ra) of less than 100 nm.

24. The coated article of claim 17, wherein said at least one melt-processible fluoropolymer (MPF) comprises perfluoroalkoxy (PFA), said high molecular weight polytetrafluoroethylene (HPTFE) is present in an amount of between 85 wt. % and 95 wt. %, and said at least one low molecular weight polytetrafluoroethylene (LPTFE) and said at least one melt-processible fluoropolymer (MPF) are together present in an amount of between 5 wt. % and 15 wt. %, based on the total solids weight of all fluoropolymers in said coating.

25. The coated article of claim 17, wherein said at least one melt-processible fluoropolymer (MPF) comprises perfluoroalkoxy (PFA), said high molecular weight polytetrafluoroethylene (HPTFE) is present in an amount of between 90 wt. % and 95 wt. %, and said at least one low molecular weight polytetrafluoroethylene (LPTFE) and said at least one melt-processible fluoropolymer (MPF) are together present in an amount of between 5 wt. % and 10 wt. %, based on the total solids weight of all fluoropolymers in said coating.

26. The coated article of claim 17, wherein said at least one melt-processible fluoropolymer (MPF) comprises perfluoroalkoxy (PFA), said at least one low molecular weight polytetrafluoroethylene (LPTFE) is present in an amount between 40 wt. % and 60 wt. % and said PFA is present in an amount of between 40 wt. % and 60 wt. % based on the total solids weight of said at least one LPTFE and said PFA.

27. The coated article of claim 17, wherein said at least one melt-processible fluoropolymer (MPF) comprises perfluoroalkoxy (PFA), said at least one low molecular weight polytetrafluoroethylene (LPTFE) is present in an amount between 45 wt. % and 55 wt. % and said PFA is present in an amount of between 45 wt. % and 55 wt. % based on the total solids weight of said at least one LPTFE and said PFA.

28. The coated article of claim 1, wherein:
said at least one melt-processible fluoropolymer (MPF) comprises perfluoroalkoxy (PFA), said high molecular weight polytetrafluoroethylene (HPTFE) is present in an amount of between 85 wt. % and 95 wt. % and said blended fluoropolymer composition is present in an amount of between 5 wt. % and 15 wt. % based on the total solids weight of all fluoropolymers in said coating composition; and
said at least one high molecular weight polytetrafluoroethylene (HPTFE) includes a modifying co-monomer in an amount less than 1 wt. % based on the weight of said high molecular weight polytetrafluoroethylene (HPTFE).

29. The coated article of claim 28, wherein said modifying co-monomer is perfluoropropylvinyl ether (PPVE).

30. The coated article of claim 28, wherein said coating has a contact angle of at least 110°.

31. The coated article of claim 30, wherein said coating has a contact angle of at least 120°.

32. The coated article of claim 28, wherein said coating has a measured gloss of at least 25% reflectance at 60°.

33. The coated article of claim 28, wherein said coating has a surface roughness (Ra) of less than 100 nm.

34. The coated article of claim 1, wherein:
said at least one melt-processible fluoropolymer (MPF) comprises perfluoroalkoxy (PFA), said at least one low molecular weight polytetrafluoroethylene (LPTFE) is present in an amount between 45 wt. % and 55 wt. % and said PFA is present in an amount of between 45 wt. % and 55 wt. % based on the total solids weight of said at least one LPTFE and said PFA; and
said at least one high molecular weight polytetrafluoroethylene (HPTFE) includes a modifying co-monomer in an amount less than 1 wt. % based on the weight of said high molecular weight polytetrafluoroethylene (HPTFE).

35. The coated article of claim 34, wherein said modifying co-monomer is a perfluoroalkylvinyl ether.

36. The coated article of claim 34, wherein said coating has a contact angle of at least 110°.

37. The coated article of claim 36, wherein said coating has a contact angle of at least 120°.

38. The coated article of claim 34, wherein said coating has a measured gloss of at least 25% reflectance at 60°.

39. The coated article of claim 34, wherein said coating has a surface roughness (Ra) of less than 100 nm.

* * * * *